(12) United States Patent
Mizrachi et al.

(10) Patent No.: US 9,032,377 B2
(45) Date of Patent: May 12, 2015

(54) EFFICIENT PARALLEL COMPUTATION OF DEPENDENCY PROBLEMS

(71) Applicant: Rocketick Technologies Ltd., Ramat Gan (IL)

(72) Inventors: Shay Mizrachi, Hod-Hasharon (IL); Uri Tal, Netanya (IL); Tomer Ben-David, Yavne (IL); Ishay Geller, Mikhmoret (IL); Ido Kasher, Tel Aviv (IL); Ronen Gal, Ramat Gan (IL)

(73) Assignee: Rocketick Technologies Ltd., Ramat Gan (IL)

( * ) Notice: Subject to any disclaimer, the term of this patent is extended or adjusted under 35 U.S.C. 154(b) by 171 days.

(21) Appl. No.: 13/907,922

(22) Filed: Jun. 2, 2013

(65) Prior Publication Data

US 2013/0263100 A1 Oct. 3, 2013

Related U.S. Application Data

(63) Continuation-in-part of application No. 12/994,153, filed as application No. PCT/IB2009/052820 on Jun. 30, 2009, now Pat. No. 8,516,454.

(60) Provisional application No. 61/079,461, filed on Jul. 10, 2008, provisional application No. 61/086,803,
(Continued)

(51) Int. Cl.
*G06F 3/00* (2006.01)
*G06F 12/00* (2006.01)
(Continued)

(52) U.S. Cl.
CPC .. *G06F 8/41* (2013.01); *G06F 9/50* (2013.01); *G06F 8/45* (2013.01)

(58) Field of Classification Search
CPC ......... G06F 8/447; G06F 8/4441; G06F 9/52; G06F 9/505; G06F 9/3009; G06F 9/3836; G06F 9/3851; G06F 9/3885; G06F 9/4843; G06F 9/4881; G06F 9/5044; G06F 11/1658; G06F 11/3041; G06F 11/3065; G06F 11/3419; G06F 11/3485; G06F 12/1024; G06F 13/124; G06F 15/161; G06F 17/5009
See application file for complete search history.

(56) References Cited

U.S. PATENT DOCUMENTS 3,725,864 A * 4/1973 Clark et al. ...................... 710/6
3,812,475 A * 5/1974 Christiansen et al. ............ 710/7
(Continued)

FOREIGN PATENT DOCUMENTS

JP 08287022 A 11/1996
JP 2004206314 A 7/2004
(Continued)

OTHER PUBLICATIONS

Japanese patent application No. 2011-517279 Office Action dated Oct. 30, 2013.
(Continued)

*Primary Examiner* — Don Wong
*Assistant Examiner* — Anibal Rivera
(74) *Attorney, Agent, or Firm* — D. Kligler I.P. Services Ltd.

(57) ABSTRACT

A computing method includes accepting a definition of a computing task, which includes multiple Processing Elements (PEs) having execution dependencies. The computing task is compiled for concurrent execution on a multiprocessor device, by arranging the PEs in a series of two or more invocations of the multiprocessor device, including assigning the PEs to the invocations depending on the execution dependencies. The multiprocessor device is invoked to run software code that executes the series of the invocations, so as to produce a result of the computing task.

32 Claims, 16 Drawing Sheets

Related U.S. Application Data filed on Aug. 7, 2008, provisional application No. 61/110,676, filed on Nov. 3, 2008, provisional application No. 61/185,589, filed on Jun. 10, 2009, provisional application No. 61/185,609, filed on Jun. 10, 2009.

(51) Int. Cl.

| | | |
|---|---|---|
| G06F 15/00 | (2006.01) | |
| G06F 9/30 | (2006.01) | |
| G06F 9/40 | (2006.01) | |
| G06F 9/44 | (2006.01) | |
| G06F 9/46 | (2006.01) | |
| G06F 9/50 | (2006.01) | |
| G06F 9/45 | (2006.01) | |

(56) References Cited

U.S. PATENT DOCUMENTS

| | | | |
|---|---|---|---|
| 4,325,120 A * | 4/1982 | Colley et al. | 711/202 |
| 4,658,351 A * | 4/1987 | Teng | 718/103 |
| 4,805,107 A * | 2/1989 | Kieckhafer et al. | 718/103 |
| 6,144,932 A | 11/2000 | Hachiya | |
| 7,353,157 B2 | 4/2008 | Wasynczuk et al. | |
| 7,409,656 B1 | 8/2008 | Ruehl | |
| 7,444,276 B2 | 10/2008 | Watt et al. | |
| 7,509,244 B1 * | 3/2009 | Shakeri et al. | 717/105 |
| 7,856,347 B2 | 12/2010 | Rich et al. | |
| 8,108,633 B2 * | 1/2012 | Munshi et al. | 718/104 |
| 8,516,454 B2 | 8/2013 | Mizrachi et al. | |
| 2002/0049956 A1 | 4/2002 | Bozkus et al. | |
| 2005/0091025 A1 | 4/2005 | Wilson et al. | |
| 2005/0125793 A1* | 6/2005 | Aguilar et al. | 718/100 |
| 2006/0130012 A1* | 6/2006 | Hatano et al. | 717/136 |
| 2006/0242618 A1 | 10/2006 | Wang et al. | |
| 2007/0038987 A1 | 2/2007 | Ohara et al. | |
| 2007/0073528 A1 | 3/2007 | Watt et al. | |
| 2007/0073999 A1 | 3/2007 | Verheyen et al. | |
| 2007/0074000 A1 | 3/2007 | Colwill et al. | |
| 2007/0129924 A1 | 6/2007 | Verheyen et al. | |
| 2007/0129926 A1 | 6/2007 | Verheyen et al. | |
| 2007/0150702 A1 | 6/2007 | Verheyen et al. | |
| 2007/0206611 A1 | 9/2007 | Shokri et al. | |
| 2007/0219771 A1 | 9/2007 | Verheyen et al. | |
| 2007/0250800 A1 | 10/2007 | Keswick | |
| 2008/0114937 A1* | 5/2008 | Reid et al. | 711/117 |
| 2008/0140998 A1* | 6/2008 | Kissell | 712/214 |
| 2008/0208553 A1 | 8/2008 | Borah et al. | |
| 2008/0276064 A1* | 11/2008 | Munshi et al. | 711/173 |
| 2009/0150136 A1 | 6/2009 | Yang | |
| 2010/0274549 A1 | 10/2010 | Tal et al. | |
| 2010/0332202 A1 | 12/2010 | Nakhia et al. | |
| 2011/0184713 A1 | 7/2011 | Yang | |
| 2011/0191092 A1 | 8/2011 | Mizrachi et al. | |

FOREIGN PATENT DOCUMENTS

| | | |
|---|---|---|
| JP | 2006259821 A | 9/2006 |
| JP | 2007048052 A | 2/2007 |
| WO | 0042535 A1 | 7/2000 |
| WO | 0135283 A2 | 5/2001 |
| WO | 0201346 A2 | 1/2002 |
| WO | 2006117683 A2 | 11/2006 |

OTHER PUBLICATIONS

Cadambi et al., "A Fast, Inexpensive and Scalable Hardware Acceleration Technique for Functional Simulation", Proceedings of the 39th IEEE ACM Design Automation Conference (DAC 2002), pp. 570-575, New Orleans, USA, Jun. 10-14, 2002.

Karypis et al., "Multilevel Hypergraph Partitioning: Applications in VLSI Domain", IEEE Transactions on Very Large Scale Integration (VLSI) Systems, vol. 7, No. 1, pp. 69-79, USA, Mar. 1999.

NVIDIA Corporation, "Technical Brief, NVIDIA GeForce® GTX 200 GPU Architectural Overview, Second-Generation Unified GPU Architecture for Visual Computing", May 2008.

Gigabyte Technology Co., Ltd., "NVIDIA® GeForceTM GTX 285 Graphics Accelerator", User's Manual, 2009.

International Application PCT/IL09/00330 Search Report dated Jul. 14, 2009.

International Application PCT/IB09/52820 Search Report dated Jan. 14, 2010.

Rubinstein, M., "Discrete Approaches to Content-Aware Image and Video Retargeting", M.Sc.Dissertation, The Interdisciplinary Center, Efi Arazi School of Computer Science, Herzlia, Israel, May 21, 2009.

Cadambi et al., "SimPLE: An Inexpensive, Scalable & Fast Hardware Acceleration Technique for Functional Simulation", C&C Research Laboratories, USA, Jun. 18, 2002.

IEEE Standard 1364-2001, "IEEE Standard Verilog® Hardware Description Language", Sep. 28, 2001.

IEEE Standard 1800-2009, "IEEE Standard for System Verilog—Unified Hardware Design, Specification, and Verification Language", Dec. 11, 2009.

Perinkulam, A.S., "Logic simulation using graphics processors", Master Thesis, University of Massachusetts, pp. 1-52, Sep. 1, 2007.

Willis et al., "Use of embedded scheduling to compile VHDL for effective parallel simulation", Proceedings of European Design Automation Conference, Brighton, UK, pp. 400-405, Sep. 18-22, 1995.

Ezudheen et al., "Parallelizing SystemC Kernel for Fast Hardware Simulation on SMP Machines", 23rd ACM/IEEE/SCS Workshop on Principles of Advanced and Distributed Simulation (PADS 2009), 1087-4097/09, pp. 80-87, Lake Placid, USA, Jun. 22-25, 2009.

Li et al., "Design and Implementation of Parallel Verilog Simulation: PVSim", Proceedings of the 17th International Conference on VLSI Design, pp. 329-334, Mumbai, India, Jan. 5-9, 2004.

Nanjundappa, M., "Accelerating Hardware Simulation on Multicores", Master Thesis, Virginia Polytechnic Institute and State University, May 4, 2010.

Flowmaster Group, Flowmaster Announcements 2008.

Todesco et al., "Symphony: A Simulation Backplane for Parallel Mixed-Mode Co-Simulation of VLSI Systems", Proceedings of the 33rd Design Automation Conference, pp. 149-154, Las Vegas, USA, Jun. 3-7, 1996.

U.S. Appl. No. 13/084,574 Office Action dated May 17, 2012.

Ottoni et al., "Automatic Thread Extraction with Decoupled Software Pipelining", 38th Annual IEEE/ACM International Symposium on Microarchitecture (Micro-38), pp. 105-116, Barcelona, Spain, Nov. 12-16, 2005.

Ottoni et al., "Global Multi-Threaded Instruction Scheduling", 40th Annual IEEE/ACM International Symposium on Microarchitecture (Micro-2007), pp. 56-67, Chicago, USA, Dec. 1-5, 2007.

Garland et al., "Parallel Computing Experiences with CUDA", IEEE Micro, vol. 28, No. 4, pp. 13-27, Jul. 1, 2008.

Ryoo et al., "Optimization Principles and Application Performance Evaluation of a Multithreaded GPU using CUDA", Proceedings of the 13th ACM SIGPLAN Symposium on Principles and Practice of Parallel Programming (PPoPP'08), pp. 73-82, Salt Lake City, USA, Feb. 20-23, 2008.

European Patent Application # 09794083.7 Extended Search Report dated Nov. 13, 2012.

U.S. Appl. No. 13/084,574 Office Action dated Oct. 11, 2012.

European Patent Application # 09724182 Extended Search Report dated Jun. 19, 2013.

U.S. Appl. No. 12/810,310 Office Action dated Jun. 11, 2013.

Narayanan et al.,"Fault simulation on massively parallel SIMD machines algorithms, implementations and results", Journal of Electronic Testing, vol. 3, No. 1, pp. 79-92, Feb. 1, 1992.

Chinese Patent Application # 200980126852.2 Office Action dated Aug. 29, 2012.

\* cited by examiner

EFFICIENT PARALLEL COMPUTATION OF DEPENDENCY PROBLEMS

CROSS-REFERENCE TO RELATED APPLICATIONS

This application is a continuation in part of U.S. patent application Ser. No. 12/994,153, filed Nov. 23, 2010, which is U.S. National Phase of PCT Application PCT/IB2009/052820, which claims the benefit of U.S. Provisional Patent Application 61/079,461, filed Jul. 10, 2008, U.S. Provisional Patent Application 61/086,803, filed Aug. 7, 2008, U.S. Provisional Patent Application 61/110,676, filed Nov. 3, 2008, U.S. Provisional Patent Application 61/185,589, filed Jun. 10, 2009, and U.S. Provisional Patent Application 61/185,609, filed Jun. 10, 2009. The disclosures of all these related applications are incorporated herein by reference.

FIELD OF THE INVENTION

The present invention relates generally to parallel computing, and particularly to methods and systems for executing dependency problems on parallel processors.

BACKGROUND OF THE INVENTION

Parallel processing techniques are used extensively for executing various kinds of computing tasks. In the field of logic design simulation, for example, Cadambi et al. describe a simulation accelerator based on a Very Long Instruction Word (VLIW) processor in "A Fast, Inexpensive and Scalable Hardware Acceleration Technique for Functional Simulation," Proceedings of the 39$^{th}$ IEEE ACM Design Automation Conference (DAC 2002), New Orleans, La., Jun. 10-14, 2002, pages 570-575, which is incorporated herein by reference. Aspects of logic simulation using VLIW processors are also addressed in U.S. Pat. No. 7,444,276 and in U.S. Patent Application Publications 2007/0219771, 2007/0150702, 2007/0129926, 2007/0129924, 2007/0074000, 2007/0073999 and 2007/0073528, whose disclosures are incorporated herein by reference.

SUMMARY OF THE INVENTION

An embodiment of the present invention that is described herein provides a computing method including accepting a definition of a computing task, which includes multiple Processing Elements (PEs) having execution dependencies. The computing task is compiled for concurrent execution on a multiprocessor device, by arranging the PEs in a series of two or more invocations of the multiprocessor device, including assigning the PEs to the invocations depending on the execution dependencies. The multiprocessor device is invoked to run software code that executes the series of the invocations, so as to produce a result of the computing task.

In some embodiments, the multiprocessor device completes a preceding invocation before beginning a subsequent invocation in the series, such that outputs of the PEs in the preceding invocation are available as input to the PEs in the subsequent invocation. In some embodiments, assigning the PEs to the invocations includes assigning a first PE to a first invocation and assigning a second PE, which according to the execution dependencies is to be executed after the first PE, in a second invocation that is later than the first invocation in the series.

In an embodiment, assigning the PEs to the invocations includes interleaving in the series one or more invocations of a Central Processing Unit (CPU) in addition to the invocations of the multiprocessor device, and assigning one or more of the PEs to the invocations of the CPU. In an embodiment, assigning the PEs to the invocations includes identifying a first portion of the computing task whose execution by the multiprocessor device is expected to outperform execution by the CPU, identifying a second portion of the computing task whose execution by the CPU is expected to outperform execution by the multiprocessor device, assigning the first portion to the invocations of the multiprocessor device, and assigning the second portion to the invocations of the CPU.

In another embodiment, assigning the PEs to the invocations includes assigning the PEs in a first portion of the computing task, which has a first level of parallelism, to the invocations of the multiprocessor device, and assigning the PEs in a second portion of the computing task, which has a second level of parallelism that is lower than the first level, to the invocations of the CPU.

In yet another embodiment, compiling the computing task includes defining a sequence of the PEs that is to be executed conditionally depending on a condition that is evaluated at run-time, and assigning the PEs to the invocations includes evaluating a criterion that aims to maximize a likelihood that the sequence will not be executed. Evaluating the criterion may include dividing the computing tasks into logical cones, each logical cone including an apex PE that is last in a respective invocation and a group of the PEs on which the apex PE depends, and a maximum depth and a maximum base size of the logical cones are specified based on the likelihood, and setting invocation boundaries at respective bases of the logical cones.

There is additionally provided, in accordance with an embodiment of the present invention, a computing apparatus including an interface and a processor. The interface is configured to accept a definition of a computing task, which includes multiple Processing Elements (PEs) having execution dependencies. The processor is configured to compile the computing task for concurrent execution on a multiprocessor device, by arranging the PEs in a series of two or more invocations of the multiprocessor device, including assigning the PEs to the invocations depending on the execution dependencies, and to invoke the multiprocessor device to run software code that executes the series of the invocations, so as to produce a result of the computing task.

There is also provided, in accordance with an embodiment of the present invention, a computing method including accepting a definition of a computing task, which includes multiple Processing Elements (PEs) having execution dependencies. The computing task is compiled for concurrent execution on a multiprocessor device, by arranging the PEs in multiple execution sequences, including compiling, for a given execution sequence, ancillary logic that evaluates a condition at run-time and, depending on the condition, enables or inhibits execution of the given execution sequence. The multiprocessor device is invoked to run software code that executes the execution sequences, so as to produce a result of the computing task.

In some embodiments, compiling the ancillary logic includes defining at a beginning of the given execution sequence an ancillary PE that evaluates the condition and enables or inhibits the execution. In an embodiment, the condition inhibits execution of the given execution sequence upon identifying that input to the given execution sequence did not change since a previous execution of the given execution sequence. In another embodiment, the condition inhibits execution of the given execution sequence upon identifying that a trigger signal of a component simulated in the given execution sequence is not asserted. In still another embodiment, the condition inhibits execution of the given execution sequence upon identifying that the execution of the given execution sequence will not affect an output of the given execution sequence.

There is further provided, in accordance with an embodiment of the present invention, a computing apparatus including an interface and a processor. The interface is configured to accept a definition of a computing task, which includes multiple Processing Elements (PEs) having execution dependencies. The processor is configured to compile the computing task for concurrent execution on a multiprocessor device, by arranging the PEs in multiple execution sequences, including compiling, for a given execution sequence, ancillary logic that evaluates a condition at run-time and, depending on the condition, enables or inhibits execution of the given execution sequence, and to invoke the multiprocessor device to run software code that executes the execution sequences, so as to produce a result of the computing task.

There is also provided, in accordance with an embodiment of the present invention, a computing method including accepting a definition of a computing task, which includes a plurality of logic sections triggered by triggering signals. The definition of the computing task is compiled for concurrent execution on a multiprocessor device, so as to generate combined logic, which executes the plurality of the logic sections and which includes ancillary logic that selectively enables execution of a part of the computing task corresponding to the logic sections whose triggering signals are asserted. The multiprocessor device is invoked to run software code that executes the combined logic, so as to produce a result of the computing task.

In some embodiments, compiling the definition includes generating a single execution sequence that executes the multiple logic sections, including configuring the ancillary logic to enable the execution of only Processing Elements (PEs) in the execution sequence corresponding to the logic sections whose triggering signals are asserted. In an embodiment, the triggering signals include at least one signal type selected from a group of types consisting of clock signals, set signals and reset signals.

In other embodiments, compiling the definition includes generating multiple execution sequences that execute the respective logic sections, and inserting into each execution sequence an ancillary Processing Element (PE) that selectively enables execution of the execution sequence depending on the respective triggering signals.

There is additionally provided, in accordance with an embodiment of the present invention, a computing apparatus including an interface and a Central Processing Unit (CPU). The interface is configured to accept a definition of a computing task, which includes a plurality of logic sections triggered by triggering signals. The CPU is configured to compile the definition of the computing task for concurrent execution on a multiprocessor device, so as to generate combined logic, which executes the plurality of the logic sections and which includes ancillary logic that selectively enables execution of a part of the computing task corresponding to the logic sections whose triggering signals are asserted, and to invoke the multiprocessor device to run software code that executes the combined logic, so as to produce a result of the computing task.

The present invention will be more fully understood from the following detailed description of the embodiments thereof, taken together with the drawings in which:

DETAILED DESCRIPTION OF EMBODIMENTS

Overview

Figure 1:
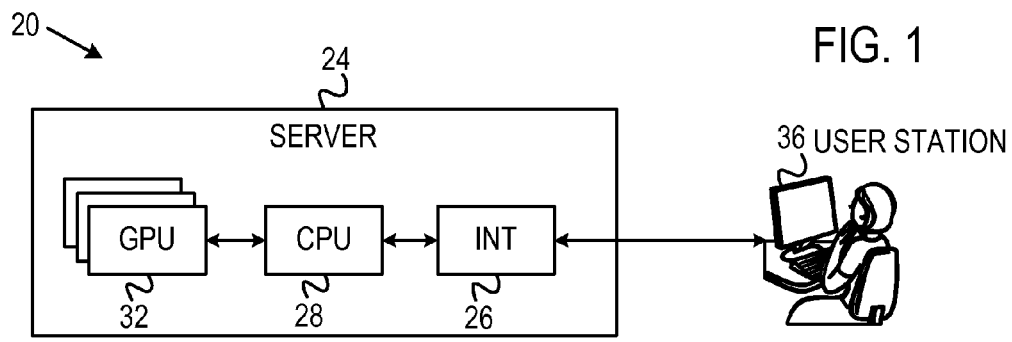
FIG. 1 is a block diagram that schematically illustrates a system for executing dependency problems, in accordance with an embodiment of the present invention.

Various types of computational tasks in a wide range of fields can be represented as dependency problems, i.e., as a set of atomic processing elements having execution dependencies. Dependency problems are often large and complex, and their execution often involves high computational complexity and execution time. Therefore, it is advantageous to execute dependency problems on multiple processors that operate in parallel. The execution dependencies between processing elements, however, often make dependency problems difficult to partition into parallel computing tasks.

Embodiments of the present invention provide improved methods and systems for executing dependency problems by parallel processors. The embodiments described herein refer mainly to simulation of hardware design, but the disclosed techniques can be applied in various other fields and applications. The disclosed methods and systems operate on a dependency problem, which comprises atomic Processing Elements (PEs) having execution dependencies. A compiler compiles the dependency problem for concurrent execution on a multiprocessor device comprising multiple processors, such as a Graphics Processing Unit (GPU).

In some embodiments, the compilation process arranges the PEs in a series of GPU invocations, also referred to as phases. The partitioning into a series of invocations is used as a synchronization mechanism: By definition, the GPU completes execution of a given invocation before starting to execute the next invocation in the series. As a result, the outputs of the PEs in a given invocation are guaranteed to be available as inputs for the PEs in subsequent invocations. Thus, in some embodiments the compiler preserves the execution dependencies between PEs by appropriately assigning PEs to invocations. Maintaining synchronization in this manner incurs only small processing overhead, in comparison with other possible synchronization mechanisms.

In some embodiments, the compiler assigns part of the dependency problem for execution by a Central Processing Unit (CPU) rather than by the GPU. In these embodiments, the compilation process produces a series of invocations, some for the CPU and some for the GPU. Typically, the compiler identifies a portion of the dependency problem in which the CPU is expected to outperform the GPU (e.g., a low-parallelism portion), and a portion of the dependency problem in which the GPU is expected to outperform the CPU (e.g., a high-parallelism portion). The former portion is assigned for execution by the CPU, and the latter portion is assigned to the GPU. Typically, although not necessarily, CPU invocations tend to occur at the beginning and end of the overall execution graph.

Yet another motivation for dividing the execution into phases is to avoid unnecessary execution of PE execution sequences. In some embodiments, the compiler is capable of inserting into the PE execution sequences logic that inhibits unnecessary execution of a PE sequence, under various conditions that are detected at run-time. By dividing the execution into phases, the likelihood of meeting such conditions and avoiding unnecessary execution is increased. An example partitioning method that achieves this goal is described.

In such embodiments, the compiler may define various conditions that, when detected at run-time, indicate that execution of a given PE sequence is unnecessary. In an embodiment, the compiler inserts into the given PE sequence an ancillary PE that detects such a condition and enables or inhibits the sequence execution accordingly. The condition may detect, for example, that the input to the given PE sequence did not change since the previous execution of the sequence, that a trigger to a simulated component along the sequence is not asserted, or that execution of the sequence will not affect the sequence outputs. In many practical scenarios, inhibiting the execution of PE sequences under such conditions provides a considerable reduction in run-time.

Other embodiments that are described herein help to exploit the parallel processing capability of the GPU even for designs that possess little or no parallelism. For example, some hardware designs comprise a large number of low-parallelism logic sections that are triggered by multiple triggering signals (e.g., clock, set and/or reset signals). In some embodiments, the compiler produces combined logic that simulates the multiple logic sections with high parallelism. To preserve the correct functionality, the combined logic comprises ancillary logic that selectively activates only the parts of the combined logic corresponding to the logic sections whose triggering signals are asserted.

System Description

FIG. 1 is a block diagram that schematically illustrates a system 20 for executing dependency problems, in accordance with an embodiment of the present invention. Various kinds of computing tasks can be represented as dependency problems, i.e., as a set of atomic processing tasks having execution dependencies. Dependency problems can be found in a wide range of fields and applications, such as, for example, digital hardware design simulation, real-time video processing, image processing, Software-Defined Radio (SDR), packet processing in various communication applications and error correction coding. System 20 can be used for efficient execution of any suitable computing task that can be represented as a dependency problem. Several examples of specific computing tasks, and the applicability of the disclosed techniques to these tasks, are described further below.

In the present example, system 20 comprises a server 24, which comprises an interface 26, a Central Processing Unit 28 and one or more Graphics Processing Units (GPUs) 32. Server 24 may comprise any suitable workstation or computing platform. Each GPU, as will be described below, comprises a large number of processing cores that operate in parallel. The methods and systems described herein produce software code that maximizes the parallel utilization of the GPU cores, and therefore enables system 20 to execute highly complex dependency problems with relatively short execution times.

Server 24 interacts with a user via a user station 36. Server 24 accepts from the user, via interface 26, a dependency problem to be executed. The server compiles the input dependency problem to produce software code, and then runs the code on CPU 28 and GPUs 32. Execution results are provided to the user via interface 26. The functionality of system 20 can be partitioned between CPU and GPUs 32 in various ways, depending on the application. The embodiments described herein refer to a single GPU. In general, however, any desired number of GPUs can be used.

Typically, CPU 28 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The configuration of system 20 is an example configuration, which is chosen purely for the sake of conceptual clarity. Any other suitable system configuration can also be used. For example, user station may communicate with server 24 locally or over a communication network. In alternative embodiments, the user station functionality can be implemented directly on server 24.

Some aspects of using a system such as system 20 for logic design simulation are addressed in PCT Application PCT/IL2009/000330, entitled "Design Simulation using Parallel Processors," filed Mar. 25, 2009, which is assigned to the assignee of the present patent application and whose disclosure is incorporated herein by reference.

Figure 2:
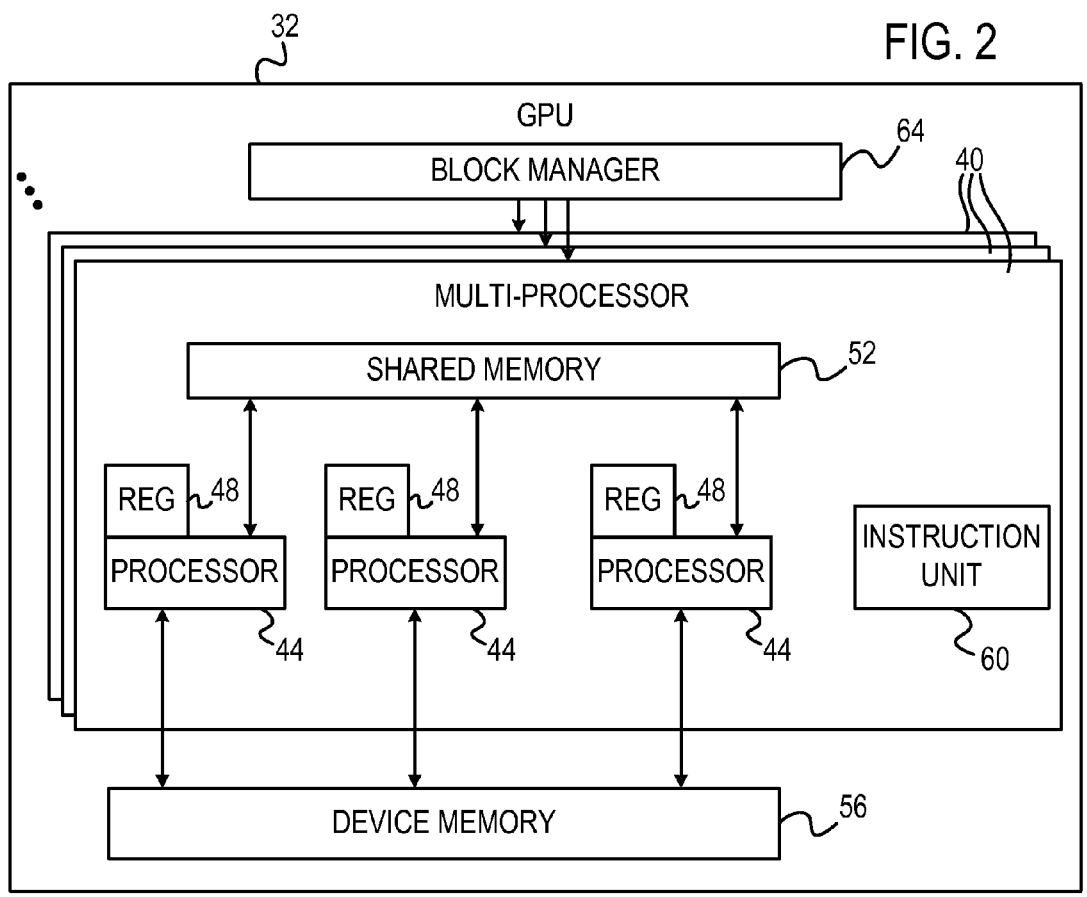
FIG. 2 is a block diagram that schematically illustrates a Graphics Processing Unit (GPU), in accordance with an embodiment of the present invention.

FIG. 2 is a block diagram that schematically illustrates the internal structure of GPU 32, in accordance with an embodiment of the present invention. In the present example, GPU 32 comprises multiple multi-processors 40. Each multi-processor 40 comprises multiple processors 44, which are also referred to herein as processing cores. In some embodiments, each multi-processor 40 comprises a Single Instruction Multiple Thread (SIMT) processor, as is known in the art. In alternative embodiments, each multi-processor 40 comprises a Single Instruction Multiple Data (SIMD) processor, in which all processors 44 run the same instruction in each clock cycle. (Different processors may, however, run the same instruction over different data.) In a typical application, all processors 44 in the entire GPU run the same instruction. The differentiation between functions of different processors is introduced by the data. The disclosed techniques are applicable to both SIMD and SIMT processors.

Each processor 44 can access a number of local registers 48. The different processors within a given multi-processor 40 can store data in a shared memory 52. This shared memory is accessible to processors 44 of the given multi-processor but not to processors of other multi-processors. In a typical GPU, each multi-processor also comprises an instruction unit 60, which manages the operation of the multi-processor. In a typical multi-processor, unit 60 creates, manages and executes concurrent threads. In particular, unit 60 may comprise hardware mechanisms that synchronize the operation of different threads running in the multi-processor.

GPU 32 further comprises a device memory 56, which is also referred to herein as an external memory. Memory typically comprises a Dynamic Random Access memory (DRAM). Unlike shared memory 52, device memory 56 is typically accessible to the processors of all multi-processors 40. On the other hand, access to device memory is typically expensive in terms of latency and throughput. In order to access memory 56 efficiently, it is typically desirable to write into or read from consecutive and aligned memory addresses. Some of the methods described herein are concerned with producing code that accesses memory 56 efficiently.

The basic software code unit that each processor 44 runs at any given time is referred to as a thread. Typically, CPU 28 invokes GPU 32 by providing the GPU with blocks of threads. A given block of threads is guaranteed to run on the processors of a single multi-processor 40 in SIMD or SIMT mode. Thus, the threads in a given block can communicate with one another via shared memory 52.

Typically, the number of threads per block can be greater than the number of processors in the multi-processor. The number of blocks provided to the GPU can generally be greater than the number of multi-processors. The GPU comprises a block manager 60, which accepts blocks for execution from CPU 28 and schedules the execution of blocks and threads according to certain internal criteria. These criteria are referred to herein as a built-in scheduling policy.

Thus, other than the guarantee that the threads of a given block are executed in the same multi-processor, there is no guarantee as to the order in which the threads of a given block are executed in the multi-processor. There is also no guarantee as to the order in which different blocks are executed in the GPU. In other words, CPU 28 generally has no control over the internal scheduling policy of the GPU.

Some of the methods and systems described herein produce code, which makes use of the architectural features of the GPU, such as the ability to synchronize and share data among threads in a given block. When partitioning the dependency problem into threads, the disclosed methods and systems preserve the inherent dependencies between different atomic processing tasks, given the non-guaranteed nature of thread and block execution in the GPU (i.e., irrespective of the scheduling policy of the GPU).

In particular, the GPU is typically specified to execute a certain number of blocks simultaneously. If the GPU is invoked with a larger number of blocks, the blocks are scheduled by block manager 60. Some of the methods and systems described herein invoke the GPU with a number of blocks that does not exceed the maximum number of blocks that can be executed simultaneously. As a result, the internal scheduling policy of block manager 60 is effectively bypassed. These features are explained in detail further below.

The GPU configuration of FIG. 2 is an example configuration, which is chosen purely for the sake of conceptual clarity. In alternative embodiments, any other suitable GPU configuration can also be used. A typical GPU device that can be used for this purpose is the GTX285 device, produced by NVIDIA Corp. (Santa Clara, Calif.). This device comprises thirty multi-processors, each comprising eight processing cores. Further alternatively, although the embodiments described herein refer to the use of a GPU, the disclosed methods and systems can be used with various other types of processors that operate multiple processing cores in parallel, such as Digital Signal Processors (DSPs) and multi-core Central Processing Units (CPUs).

Representing Dependency Problems Using Dependency Graphs

CPU 28 represents an input dependency problem in terms of atomic execution tasks, which are referred to herein as Processing Elements (PEs). When the dependency problem is executed by GPU 32, each PE corresponds to a thread that is executed by a certain processor 44. The CPU typically holds a library of PE types, each type performing a certain atomic task (e.g., look-up table lookups, flip-flops, buffering operations, memory access operations, multiplexing operations, arithmetic operations, logical operations or any other suitable task types). Each PE belongs to one of the types, and operates on certain data.

When processors 44 operate in SIMT mode, each thread typically comprises code that is able to run the different PE types. When the thread is executed, the actual PE type executed by the thread is selected by the data. The data read by the thread can select the actual PE type, for example, by jumping to a program address that carries out the desired PE functionality, or using any other suitable selection means. A typical thread may thus execute the following flow:

Read the desired PE type from memory 56, and jump to the appropriate address that implements this PE type.
Read the PE parameters and input values from memory 56.
Execute the desired PE functionality.
Write the PE output values to memory 56.

(In order to access memory 56 efficiently, CPU 28 may divide the PEs into PE Groups—PEGs. This feature is addressed in detail further below, and also in PCT Application PCT/IL2009/000330, cited above.) Typically, the thread load and store operations are not linked with the PE parameters of the thread. For example, a given PEG may support up to sixty-four load commands from the device memory to the shared memory. A given thread may load data that is not used by its PEs.

When using the above-mentioned technique in a SIMT processor, it is generally desirable that threads that are scheduled to run concurrently in a given multi-processor SIMT unit will run the same PE types, so that the unit will run effectively in SIMD mode.

Figure 3:
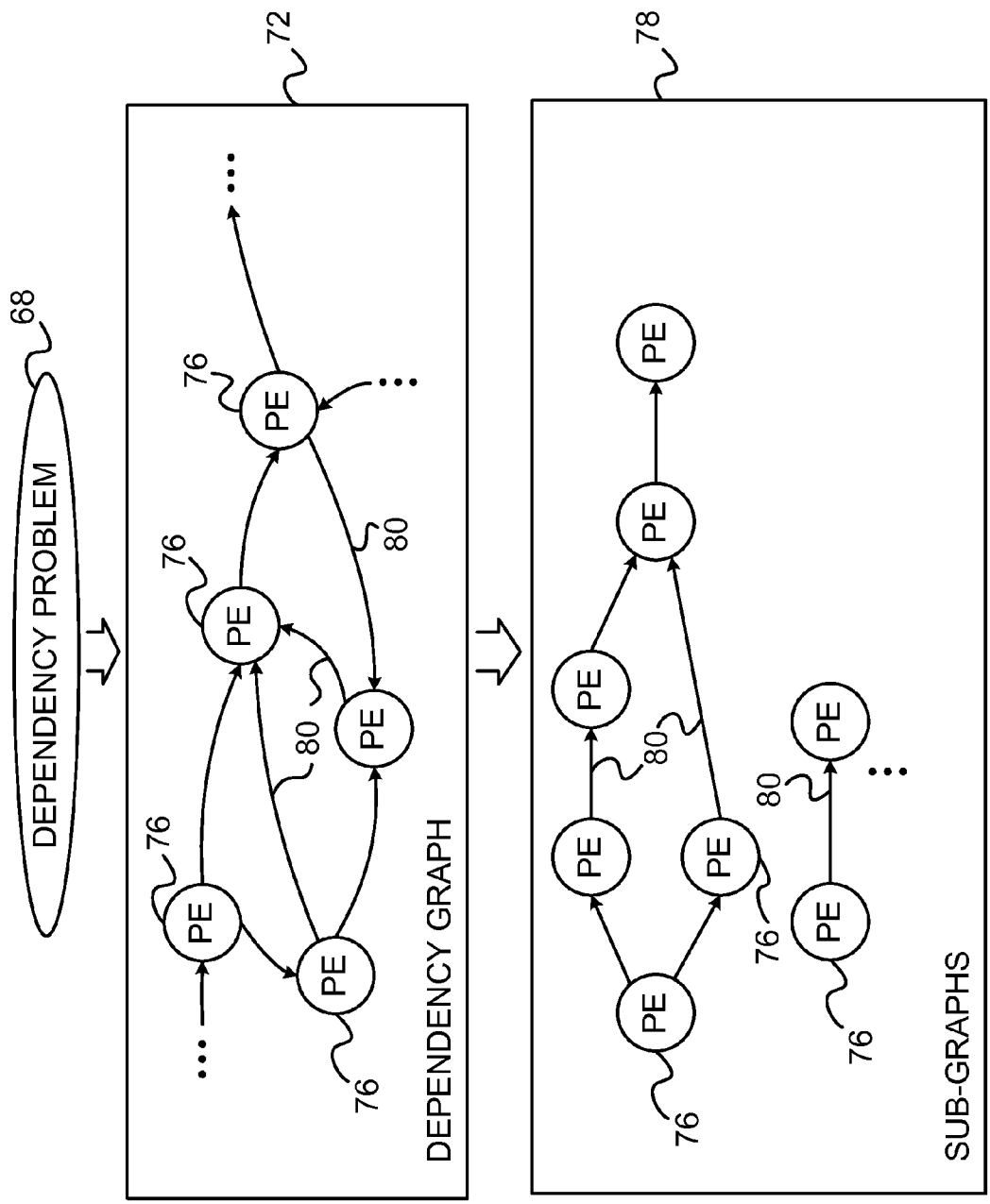
FIG. 3 is a diagram that schematically illustrates a dependency problem represented by dependency graphs, in accordance with an embodiment of the present invention.

FIG. 3 is a diagram that schematically illustrates a dependency problem represented by a dependency graph, in accordance with an embodiment of the present invention. CPU 28 represents the dependency problem using multiple PEs, which are interconnected by execution dependencies. A given dependency specifies that the output of a certain PE (referred to as the "driving" PE) is to be used as input to another PE (referred to as the "driven" PE). In other words, the driven PE depends on the driving PE. Such a dependency means that the driving PE is to be executed before the driven PE, since otherwise the input of the driven PE will not be valid.

FIG. 3 shows an example dependency problem 68, which is converted into a dependency graph 72. Graph 72 comprises multiple vertices 76 that represent the PEs, and directed edges 80 that represent the execution dependencies. A given edge is directed from the driving PE to the driven PE. In some embodiments, CPU 28 produces multiple sub-graphs 78 from dependency graph 72. Unlike dependency graph 72, which may generally be cyclic, each sub-graph 78 is a-cyclic.

The methods described below convert a give a-cyclic sub-graph into code that is executed on GPU 32. If the dependency problem is represented using multiple sub-graphs, the disclosed methods are typically applied to each sub-graph separately. In some embodiments, commonalties between variables among different sub-graphs can be exploited to increase computational efficiency. These features are addressed further below.

Representing and Executing Dependency Graphs Using Static Invocation Database (SID)

In some embodiments, CPU 28 compiles the input dependency problem to produce an invocation data structure, which is referred to herein as a Static Invocation Database (SID). The SID is provided to GPU 32 for execution. CPU 28 typically runs a compiler program that produces the SID. In the description that follows, actions performed by CPU 28 are sometimes referred to as being carried out by the compiler, for the sake of clarity. In alternative embodiments, however, the compiler may run on any suitable processor so as to produce the SID. The resulting SID can then be provided to system 20 for execution.

The SID comprises a set of PE execution sequences, which are guaranteed to run in parallel to one another and at a particular order, irrespective of the internal scheduling policy of the GPU. When the GPU is invoked with the SID, each execution sequence is provided to the GPU as a block of threads. Thus, the PEs within each sequence are guaranteed to run in the same multiprocessor of GPU 32. Additionally, the number of execution sequences in the SID does not exceed the maximum number of blocks that can be executed simultaneously by the GPU. As a result, the execution sequences are guaranteed to run simultaneously in the GPU, and are generally unaffected by the internal scheduling policies of block manager 60. In other words, the internal scheduling policy of the GPU is effectively bypassed, and the execution order of the PEs is fully controlled by the SID.

Figure 4:
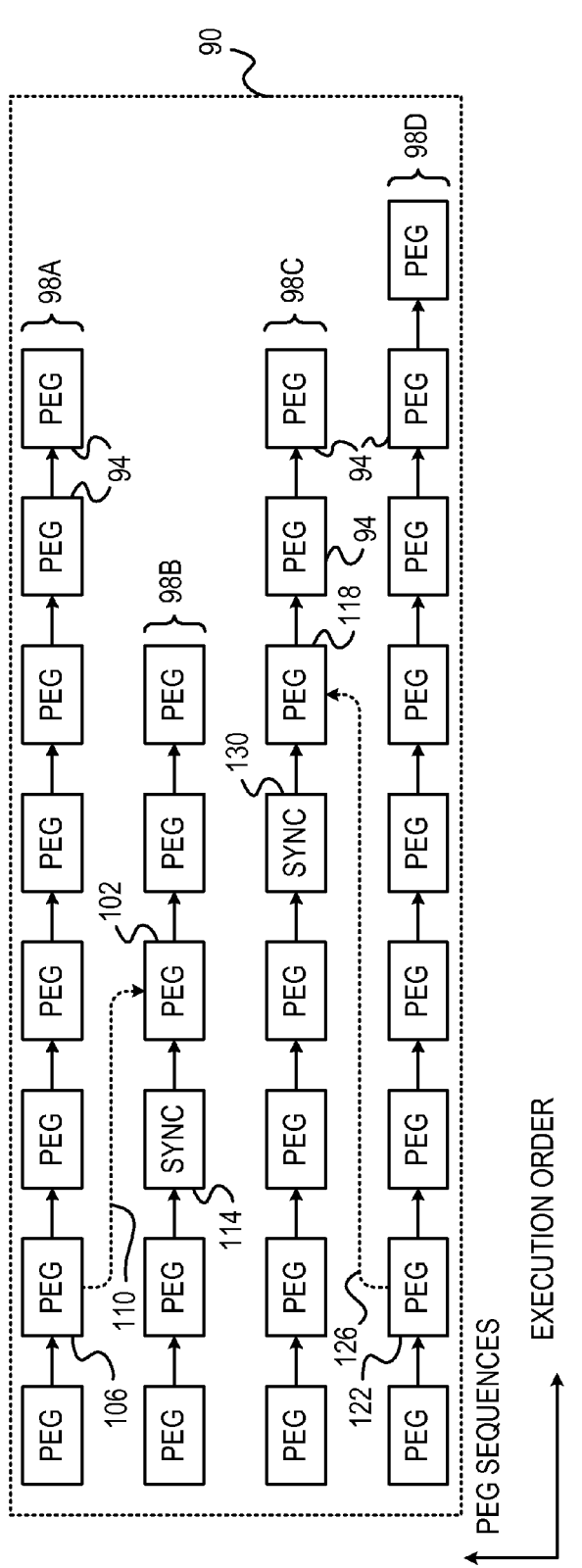
FIG. 4 is a diagram that schematically illustrates a Static Invocation Database (SID), in accordance with an embodiment of the present invention.

FIG. 4 is a diagram that schematically illustrates a SID 90, in accordance with an embodiment of the present invention. SID 90 comprises a set of execution sequences, in the present example four sequences 98A . . . 98D. Generally, however, any suitable number of sequences, which is greater than one but does not exceed the maximum number of blocks that can be executed simultaneously by the GPU, can be used. Each execution sequence comprises a series of PEGs 94, which are executed one following the other. (Grouping of PEs into PEGs is addressed further below.)

The number of blocks that the GPU can run simultaneously is typically given by the number of multiprocessors 40 multiplied by the number of blocks that can be executed simultaneously by each multiprocessor. The actual number of concurrent blocks per multiprocessor may sometimes be limited by multiprocessor resources (e.g., registers, shared memory or thread count), and thus it may be smaller than the specified number of concurrent blocks per multiprocessor.

In some cases, the actual number of concurrent blocks per multiprocessor can be written as min((multiprocessor_register_count/program_reg_count),(multiprocessor_shared_memory_size/program_shared_memory),(number of threads per multiprocessor/number of threads per block), specified number of concurrent blocks per multiprocessor). The GTX285 GPU, for example, has 30 multiprocessors 40. Each multiprocessor comprises 16,384 registers and a 16 Kbyte shared memory, and support up to 1,024 concurrent threads and up to eight concurrent blocks. In an example embodiment, the GPU code produced by the compiler uses 2 KB of shared memory and fifteen registers per thread, wherein each block comprises sixty-four threads. This code results in a total of 15×64=240 registers per block. In this example, the number of concurrent blocks per multiprocessor is min(16 KB/2 KB,16384/240,1024/64,8)= min(8,68,16,8)=8. The maximum number of concurrent blocks that can be executed simultaneously by the entire GPU is thus 8×30=240.

Different execution sequences may generally have different lengths, i.e., different execution times. Typically, CPU 28 attempts to compile the dependency problem into a SID whose execution time is minimal. In other words, the CPU attempts to produce a SID having the shortest execution sequences, without exceeding the maximum permitted number of sequences. An example SID generation process of this sort is described in detail further below.

Since each execution sequence comprises a block of threads that are guaranteed to run in the same multiprocessor 40, the PEGs within a given sequence are guaranteed to run in the correct order. Thus, placing a driving PE before its respective driven PE in the same execution sequence would guarantee that the execution dependency between the PEs will not be violated. Moreover, PEGs belonging to the same execution sequence may exchange data using shared memory 52 of the multiprocessor that runs this sequence.

In many dependency problems, however, the constraint of placing every pair of dependent PEs in the same execution sequence is too severe. Such a constraint often produces a small number of extremely long execution sequences, and therefore increases execution time and limits the achievable parallelization. In many cases, it is desirable to place dependent PEs in different execution sequences while still preserving the execution dependencies.

In some embodiments, the compiler forces synchronization between different execution sequences in the SID, in order to preserve the dependencies between PEs that are placed in different sequences. In FIG. 4, for example, a PEG 102 in sequence 98B depends on a PEG 106 in sequence 98A, as indicated by a dependency 110. (More accurately, PEG 102 contains a PE that depends on a PE in PEG 106.) In order to ensure that PEG 106 executes completely before PEG 102 begins execution, the compiler places a synchronization element, e.g., a SYNC PEG 114, in sequence 98B before PEG 102. SYNC 114 halts the execution of sequence 98B until PEG 106 completes execution and produces valid output. The output of PEG 106 is then provided as input to PEG 102, and sequence 98B may resume execution. Similarly, a PEG 118 in sequence 98C depends on a PEG 122 in sequence 98D, as indicated by a dependency 126. In order to preserve this dependency, the compiler places a SYNC PEG 130 in sequence 98C before PEG 118.

Synchronization between sequences is typically implemented using device memory 56. For example, a driving PEG may signal its execution status by writing to a certain region in device memory 56. A SYNC PEG may poll this region and resume execution of its sequence only when the driving PEG has completed execution.

Note, however, that not every pair of dependent PEs in different sequences necessarily requires addition of a SYNC PEG. Assume, for example, that the last PEG in sequence 98C depends on the first PEG in sequence 98D. In this case, it is not necessary to add another SYNC PEG to sequence 98C, since the existing SYNC PEG 130 already ensures that the last PEG in sequence 98C will not execute unless the first PEG in sequence 98D completed execution.

Generally, a certain SYNC PEG may depend on any desired number of PEGs in any desired number of sequences, i.e., halt execution of a given sequence until a predefined set of driving PEGs have completed execution. In some embodiments, the synchronization functionality may be embedded in the driven PEGs without using dedicated SYNC PEGs.

Forcing synchronization between sequences can be highly-effective in balancing the execution times of different sequences, and thus increasing parallelization. On the other hand, the synchronization mechanism introduces latency and involves costly access to device memory 56. As will be explained below, the compiler typically attempts to trade-off these advantages and penalties in order to achieve the lowest overall execution time of the SID.

Figure 5:
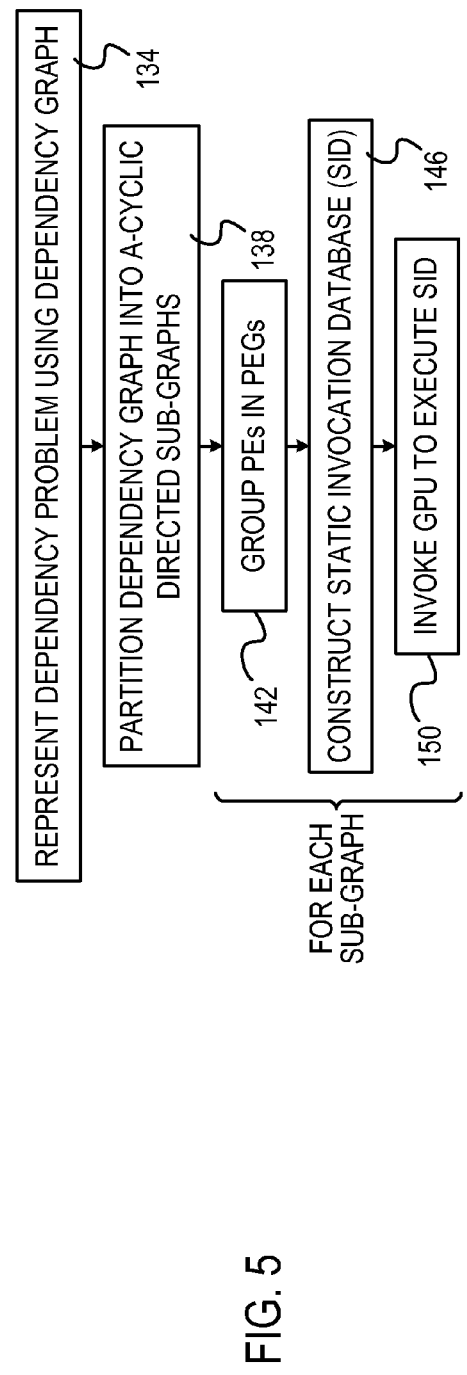
FIG. 5 is a flow chart that schematically illustrates a method for executing a dependency problem, in accordance with an embodiment of the present invention.

FIG. 5 is a flow chart that schematically illustrates a method for executing a dependency problem, in accordance with an embodiment of the present invention. The method begins with CPU 28 receiving an input dependency problem, which is represented as a dependency graph, at a graph input step 134. The CPU partitions the dependency graph into directed, a-cyclic sub-graphs, at a partitioning step 138. Partitioning of a dependency graph into directed, a-cyclic sub-graphs is addressed, for example, in PCT Application PCT/IL2009/000330, cited above. For each sub-graph, the CPU groups the PEs into PEGs, at a grouping step 142, and arranges the PEGS in a SID, at a SID construction step 146. The CPU invokes GPU 32 to execute the SID, at an invocation step 150. The GPU executes the PEG sequences in the SID, so as to produce a result of the computing task.

Efficient Sid Generation

As noted above, the compiler running on CPU 28 typically attempts to produce a SID having the shortest execution time for a given maximum number of execution sequences. The input to such a process is a directed, a-cyclic dependency sub-graph of PEs, which is to be converted to a SID. In some embodiments, the compiler generates the SID by gradually filling a two-dimensional grid of warps with PEs, in a manner that preserves the execution dependencies between the PEs.

A warp is a group of threads of the same type, which run concurrently and efficiently in a given multiprocessor. The maximum number of threads (and thus PEs) in a warp may vary from one GPU type to another. In the NVIDIA GTX285 device, for example, each warp runs thirty-two threads. As will be shown below, several warps can later be joined to form a PEG.

Figure 6:
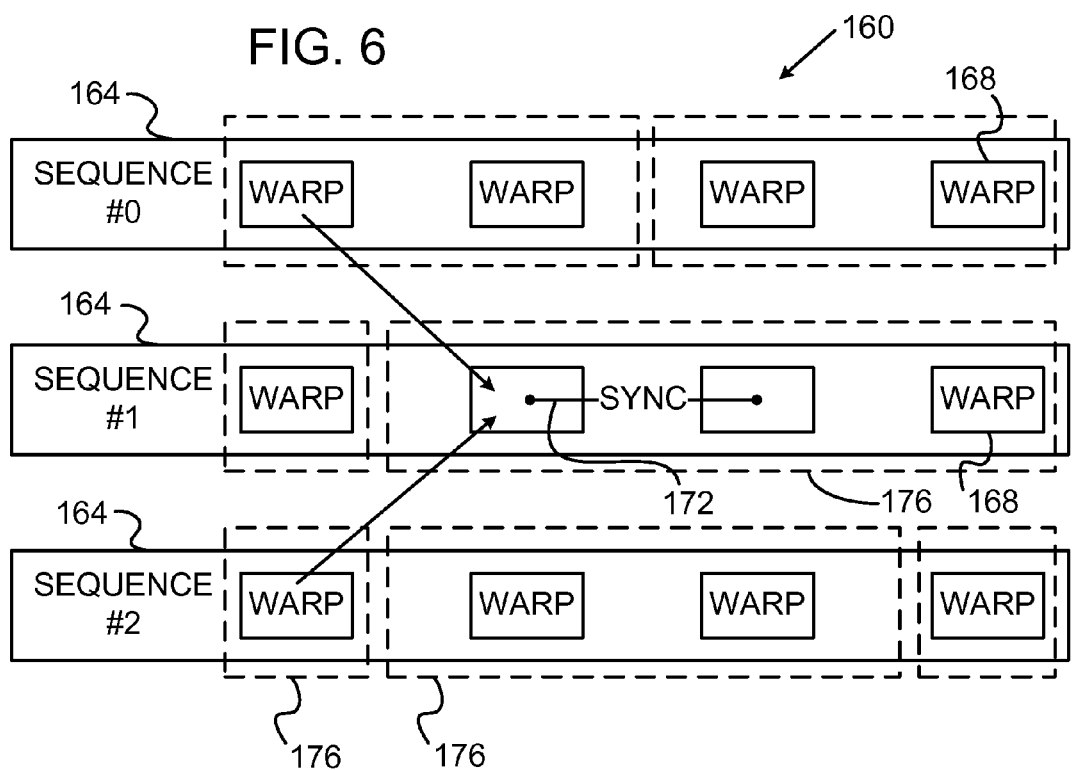
FIG. 6 is a diagram that schematically illustrates a grid of warps used in SID generation, in accordance with an embodiment of the present invention.

FIG. 6 is a diagram that schematically illustrates a warp grid 160 used for SID generation, in accordance with an embodiment of the present invention. Grid 160 comprises multiple execution sequences 164, each comprising multiple warp slots 168. The warp slots are initially empty, and the compiler gradually fills them with PEs. In order to force synchronization between different execution sequences, the compiler sometimes inserts SYNC warps 172 into the sequences. (Note that the SYNC warps differ from ordinary warps in that they do not contain threads for execution. The SYNC warps imitate the latency of a SYNC operation that will be inserted into the sequence.) At the end of the process, each PE in the input sub-graph is placed in one of the warp slots (each warp slot may contain multiple PEs of the same type). The compiler then forms PEGs 176 from the warps, in some cases joining two or more adjacent warps in a given sequence to form a PEG. The grid of PEGs is output as the desired SID.

Typically, the number of execution sequences 164 in grid 160 is set so as not to exceed the maximum number of thread blocks that the GPU can run simultaneously, so that execution of the resulting SID will not be affected by internal GPU scheduling. The number of warp slots per sequence is typically initialized as the length of the longest path in the input sub-graph.

Because of the dependencies between PEs, each PE can only be placed in a certain partial subset of the columns of grid 160. This subset is referred to as the allocation interval of the PE. For example, a PE that depends on another PE cannot be placed in the first column of the warp grid (i.e., at the beginning of any execution sequence), since the driving must be executed first. Similarly, a PE that drives another PE cannot be placed in the last column of the grid.

Generally, each PE in the sub-graph has a certain allocation interval, which defines the columns of grid 160 in which the PE can be potentially placed. The allocation interval of a PE x depends on two parameters, which are referred to as the backward phase (denoted BP(x)) and the forward phase (denoted PF(x)) of PE x. The backward phase of a given PE is defined as the number of PEs along the longest path in the sub-graph that leads to this PE. The forward phase of a given PE is defined as the number of PEs along the longest path in the sub-graph that begins at this PE.

Using this terminology, the length of the longest path in the sub-graph (and therefore the number of columns in warp grid 160) is given by L=max(BP(x)+FP(x))+1, wherein the maximum is taken over all the PEs x in the sub-graph. The allocation interval of a PE x is given by [BP(x),L-FP(x)]. These allocation intervals reflect the situation at the beginning of the allocation process. The allocation intervals typically change as the allocation process progresses.

Figure 7:
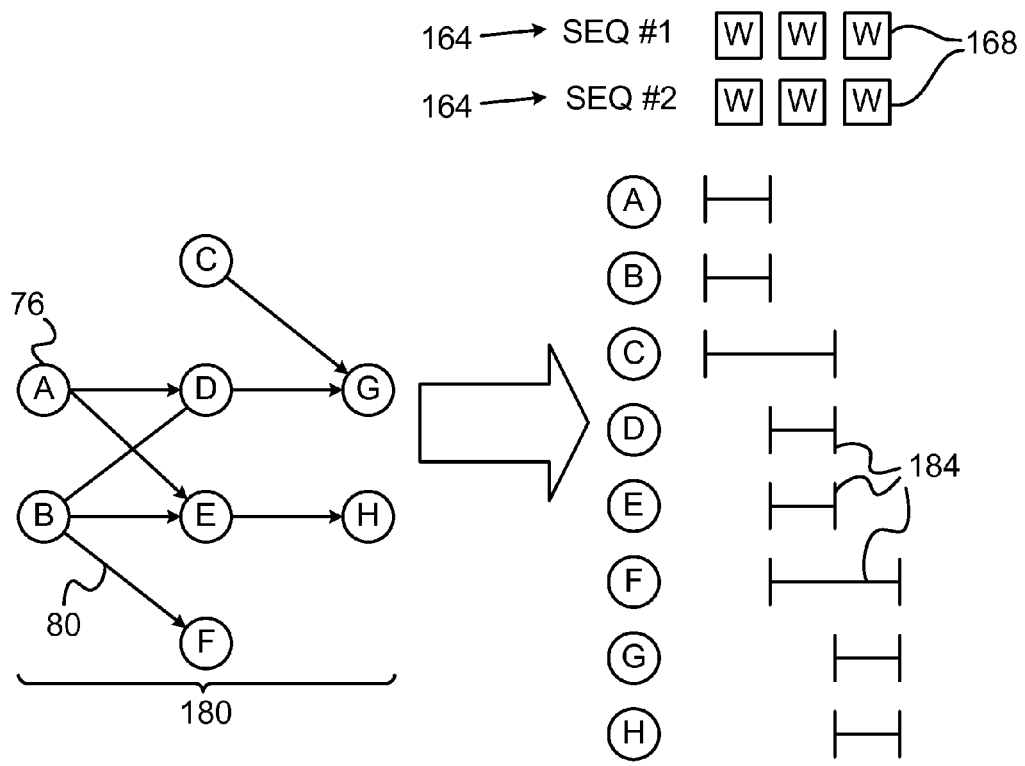
FIG. 7 is a diagram that schematically illustrates allocation intervals for allocating Processing Elements (PEs) in a grid of warps, in accordance with an embodiment of the present invention.

FIG. 7 is a diagram that schematically illustrates allocation intervals for placing PEs in a grid of warps, in accordance with an embodiment of the present invention. FIG. 7 refers to an example sub-graph 180, which comprises eight PEs 76 denoted A . . . H. The PEs are to be placed in a warp grid having two sequences 164. Since the longest path through this graph is three PEs long, each sequence 164 in this example comprises three warp slots 168.

The forward and backward phases of the eight PEs are given in the following table:

|    | PE |   |   |   |   |   |   |   |
|----|----|---|---|---|---|---|---|---|
|    | A  | B | C | D | E | F | G | H |
| FP | 2  | 2 | 1 | 1 | 1 | 0 | 0 | 0 |
| BP | 0  | 0 | 0 | 1 | 1 | 1 | 2 | 2 |

At the beginning of the allocation process, i.e., when the warp grid is still empty, the eight PEs have allocation intervals 184 as shown in the figure. In this example, PEs A and B can only be placed in the first column of the grid, since each of them drives a path of two PEs. PE C can be placed anywhere but the last column, since it drives a one-PE path. PEs D and E can only be placed in the second column, since each of them is driven by a certain PE and drives a certain PE. PE F can be placed anywhere but the first column, it is driven by a one-PE path. Finally, PEs G and H can only be placed in the last column, since each of them is driven by a two-PE path.

The example of FIG. 7 demonstrates that some PEs are more heavily-constrained than others in terms of the possibilities of placing them in grid 160. A PE having a short allocation interval is heavily constrained, whereas a PE having a longer allocation interval has more degrees of freedom in allocation.

Figure 8:
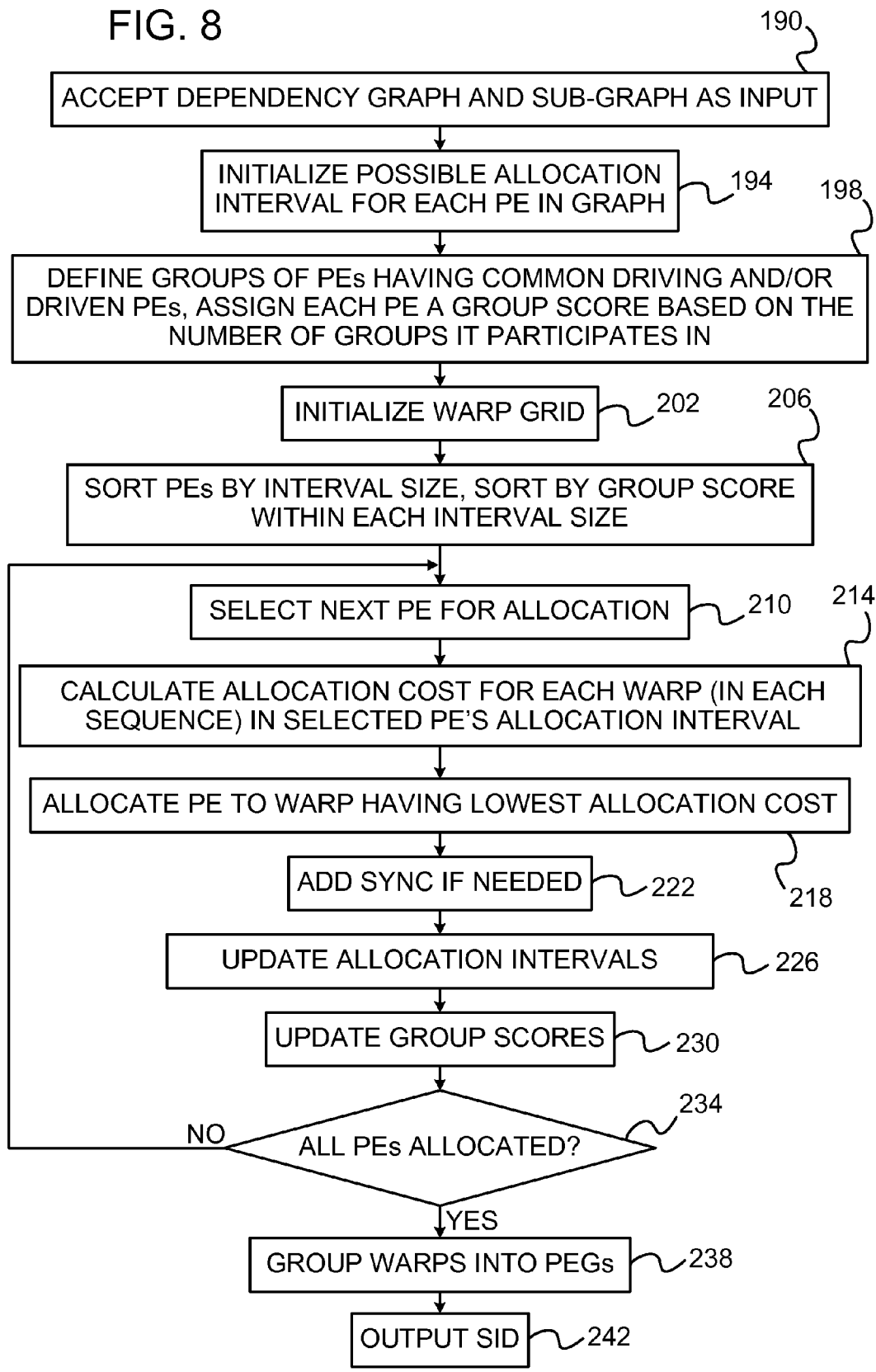
FIG. 8 is a flow chart that schematically illustrates a method for generating a SID, in accordance with an embodiment of the present invention.

FIG. 8 is a flow chart that schematically illustrates a method for generating a SID, in accordance with an embodiment of the present invention. The method begins with the compiler running on CPU 28 accepting a dependency sub-graph for conversion into a SID, at an input step 190. In some embodiments, the compiler also accepts the complete dependency graph from which the sub-graph was derived, which typically comprises additional PEs and dependencies. When generating a single SID irrespective of other SIDs, accepting the complete graph is usually unnecessary. The compiler may use the complete graph, however, when considering other SIDS of other sub-graphs of the same graph. This feature is addressed further below. In addition, the compiler may accept as input the number of execution sequences N, the latency D of a SYNC in warp slot units, the warp size (i.e., the number of PEs per warp) and the PE types.

The compiler initializes an allocation interval for each PE in the sub-graph, at an interval initialization step 194. As explained above, the initial allocation interval of a PE x is given by [BP(x),L-FP(x)].

The compiler defines PE input and output groups, at a group definition step 198. An input group comprises a group of PEs having a common input (i.e., PEs that are driven by the same driving PE). The common driving PE is referred to as the pivot of the group. An output group comprises a group of PEs having a common output (i.e., PEs that drive the same driven PE). The common driven PE is referred to as the pivot of the group.

For example, the compiler may create an output group for every PE x in the entire dependency graph, such that PE x is the pivot of that group. The PEs in this output group comprise the PEs in the sub-graph, which drive PE x. Similarly, the compiler may create an input group for every PE x in the entire dependency graph, such that PE x is the pivot of that group. The PEs in this input group comprise the PEs in the sub-graph, which are driven by PE x. Note that in this example the compiler creates input and output groups for each PE in the entire graph. The PEs in the groups, however, are selected only from the sub-graph and not from the entire graph.

The reason for constructing the input and output groups is that it is generally desirable to place PEs having common inputs and/or outputs in the same execution sequence (although possibly in different warps). The reason for considering the entire graph is that it is sometimes desirable to place in the same sequence PEs that serve as common inputs or outputs of PEs in other SIDs. The compiler assigns each PE in the sub-graph a group score, which is defined as the number of input and output groups that contain the PE.

The compiler initializes a grid of warps having N execution sequences, each sequence having L warp slots, at a grid initialization step 202.

In some embodiments, the compiler pre-sorts the PEs of the sub-graph, at a sorting step 206. The compiler sorts the PEs in increasing order of the size of their allocation intervals. The PEs having the same allocation interval size are sorted in decreasing order of their group score. Subsequently, the compiler selects PEs for placement in the grid according to the sorted order. Thus, the PEs having the shortest allocation intervals are placed in the grid first. For a given allocation interval size, PEs having a large group score (PEs that are members of a large number of input and/or output groups) are placed first. In an alternative embodiment, the compiler may select the next PE for placement in the grid by selecting the M PEs having the shortest allocation intervals (M denoting a predefined integer). From these PEs, the compiler chooses the PE having the largest group score. The above-mentioned allocation orders attempts to allocate the most heavily-constrained PEs first, so as to leave as many degrees of freedom for subsequent allocation iterations.

The compiler selects the next PE for placement in the grid from among the sorted PEs, at a current PE selection step 210. The compiler then computes a respective allocation cost for each possibility of placing this PE in the grid, at an allocation cost computation step 214. Typically, the compiler examines the warp slots within the PE's allocation interval, over the N execution sequences. (In some cases, a certain warp is not a candidate for placing a given PE even though it is within the PE's allocation interval. For example, the warp may already be fully populated, or it may comprise PEs whose type is different from that of the examined PE.)

In some embodiments, the compiler may examine warp slots that lie slightly outside the allocation interval of a given PE. For example, in some cases it may be preferable to deliberately place a PE outside beyond its allocation interval (and thus slightly increase the SID execution time), as opposed to adding a SYNC (which may incur a worse penalty in SID execution time). Thus, in some embodiments, the compiler examines the allocation interval plus a number of warp slots that is on the order of the latency introduced by a SYNC.

The compiler computes an allocation cost for each potential warp slot. The allocation cost is a quantitative measure, which indicates the potential penalty of placing the PE in a particular warp slot.

The compiler may apply any suitable criteria or heuristic in computing allocation costs. In an example implementation, the following rules can be used:

- Increase the cost by 1000 for each warp-slot delay in the total SID execution time, which would be caused by placing the PE in the examined warp slot. This rule imposes a severe penalty for increasing the total execution time.
- Reduce the cost by 10 for each PE, which is already placed in the same sequence as the examined warp slot and is a member of an input or output group that also contained the examined PE. This rule gives preference to placing members of input or output groups in the same sequence.
- Reduce the cost by 10 for each execution dependency (direct or indirect, forward or backward), which is associated with the examined PE and whose other PE resides in the same sequence as the examined warp slot. This rule gives preference to placing both ends of an execution dependency in the same sequence (and potentially avoiding insertion of a SYNC between sequences).
- Increase the cost by the column distance from the optimal column of the examined PE. The optimal column of a PE x is defined as $BP(x) \cdot L/ORIG\_L$, wherein L denotes the current number of populated columns in the grid, and L_ORIG denotes the longest path in the sub-graph. Note that the optimal column may fall outside of the allocation interval of the PE.

In some embodiments, the compiler may compute the allocation cost by examining the different critical sub-graph paths that traverse the PE and calculating their durations, assuming the PE were placed at a certain warp slot. This sort of calculation would consider the additional SYNCS that would be added and their associated costs. Further additionally or alternatively, the compiler may assign allocation costs to the different warp slots in the examined PE's allocation interval using any other suitable criterion or heuristic.

The compiler now places the PE in the warp slot having the lowest allocation cost, at a placement step 218. If necessary due to the new placement, the compiler inserts a SYNC, at a SYNC insertion step 222. A SYNC has a predefined duration of an integer number of warp slots, e.g., two slots. Each SYNC comprises a list of one or more warps whose execution must finish before the SYNC resumes execution of its own sequence. The warps that are polled by a given SYNC may reside in any number of sequences. The list typically may not contain multiple warps from the same sequence.

The compiler updates the allocation intervals of the remaining unallocated PEs to reflect the placement possibilities following the new placement, at an interval updating step 226.

In some embodiments, the compiler updates the group scores of the remaining PEs following the new placement, at a group score updating step 230. For example, the compiler may increase the group scores of PEs that share the same input or output group with the newly-placed PE. This rule gives preference to input or output groups whose members are already partially allocated. As another example, the compiler may increase the group scores of PEs that share an execution dependency (direct or indirect, forward or backward) with the newly-placed PE.

The compiler checks whether all PEs in the sub-graph have been placed in the warp grid, at a checking step 234. If there are remaining PEs for allocation, the method loops back to step 210 above, in which the compiler selects the next PE to be placed. If all PEs have been allocated, the compiler groups successive warps into PEGs, at a PEG creation step 238. Typically, each PEG may comprise only a certain number of successive warps of the same sequence, e.g., a maximum of two warps, plus possibly a SYNC. In addition, a PEG may comprise only PEs that are independent of one another, since there is no guarantee as to the order of PE execution within the PEG. In FIG. 6 above, for example, some PEGs 176 comprise only a single warp, some PEGs comprise two warps, and one of the PEGs comprises one warp and one SYNC.

At this stage, the compiler outputs the resulting populated warp grid (a set of N PEG execution sequences) as the desired SID, at an output step 242.

Typically, the SID generation process described above assumes that the warp slot duration takes into account the durations of the different PEG operations, such as load, synchronization, execution and store commands. In some cases, however, load and store command durations can be neglected. The description above assumes that all warps are of the same duration, and that the duration of a SYNC is an integer multiple of a warp slot. The description also assumes that the duration of a PEG is equal to the sum of durations of its warps and SYNCs. All of these assumptions, however, are not mandatory, and alternative SID generation schemes may make other assumptions.

In some cases, the compiler has to increase the maximum execution sequence length, i.e., the total SID execution time. Increasing L may be needed, for example, when the compiler is unable to place a certain PE in any of the warps in the PEs allocation interval. L may also be increased following insertion of a SYNC, although some SYNC insertions do not cause an increase in L. An increase in L typically means that previously-placed warps and SYNCs beyond a certain column are pushed to the right. This push may trigger a chain of subsequent push-right operations of other warps and/or SYNCs. When computing the allocation cost of a certain warp position (at step 214 above), the cost is usually increased only in response to push-right operations that increase the overall SID execution time L. Push-right operations that do not change L typically do not incur allocation cost.

In many situations, the compiler encounters several options for placing a given PE. In some cases, it may not be globally optimal to place a given PE in the lowest-cost position (at step 218 above) because this placement may cause considerable penalties in future PE placements. Therefore, the compiler may improve the PE allocation process by considering two or more alternative SIDs in parallel, and carry out two or more respective alternative allocation processes in these SIDs. Various search methods, such as "A-star" schemes or even genetic search algorithms, may be used to converge to the globally best SID.

Memory Management for Efficient Sid Operation

As can be appreciated, executing a SID on GPU 32 often involves large numbers of memory access operations. In the GPU, data can be stored in device memory 56 or in shared memory 52. Device memory 56 typically offers large storage space (e.g., several Gigabytes), but access to this memory is costly in terms of latency. Typically, multiprocessors 40 access device memory 56 at a large granularity (e.g., 512 bits at a time). Thus, the cost of reading or writing a single bit to device memory 56 is similar to the cost of reading or writing 512 bits. Read and write commands to device memory 56 are typically aligned to these large-granularity addresses. On the other hand, shared memory 52 in each multiprocessor can be accessed by processors 44 of that multiprocessor at a relatively fast access time, in small granularity and without alignment. The size of shared memory 52, however, is considerably smaller than that of the device memory (e.g., on the order of Kilobytes as opposed to Gigabytes).

In some embodiments of the present invention, the PEG sequences in the SID use shared memories 52 as cache memories, in order to access device memory 56 efficiently and minimize the associated latency penalties. In the description that follows, the terms "shared memory" and "cache" are sometimes used interchangeably.

It is important to note that the caching and memory management schemes described herein are fully-determined during compilation, and remain deterministic throughout SID execution. This feature is in contrast to some known caching schemes, whose operation may vary according to data at runtime and are therefore statistical in nature. In the techniques described herein, the pattern and timing at which data is requested and produced by the different PEG sequences is known a-priori during compilation. The compiler may exploit this knowledge and decide on certain optimal memory management means (e.g., caching in or out of a certain variable at a certain time, or consolidating multiple read requests into a single read operation) that access device memory 56 efficiently. These means will be carried out deterministically by the GPU at runtime.

Figure 9:
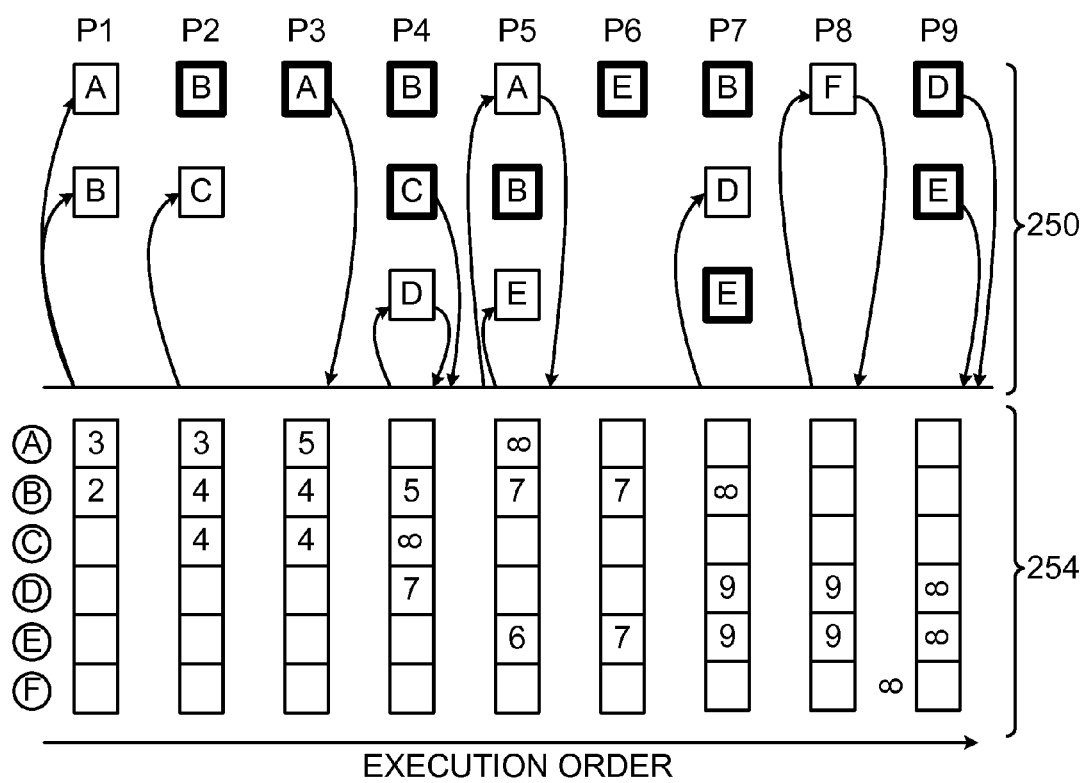
FIG. 9 is a diagram that schematically illustrates a cache management scheme, in accordance with an embodiment of the present invention.

FIG. 9 is a diagram that schematically illustrates a cache management scheme, in accordance with an embodiment of the present invention. FIG. 9 refers to a specific PEG execution sequence, which comprises nine PEGs denoted P1 ... P9. The PEGs use as input six variables denoted A ... F, with each PEG using a certain subset of these variables. In the present example, shared memory 52 can hold a maximum of three variables at any given time. The compiler defines a deterministic caching pattern, which specifies when certain variables are to be fetched from device memory 56 into shared memory 52 and when certain variables are to be discarded, so as to optimize the use of the limited-size shared memory and minimize the number of read operations from the device memory. A region 250 at the top of the figure shows the variables used as input by each PEG. For example, PEG P1 uses variables A and B as input, PEG P2 uses variables B and C, PEG P3 uses only variable A, and so on. An up-pointing arrow denotes a variable that is fetched from device memory 56 to shared memory 52 for use as input by the corresponding PEG. A down-pointing arrow denotes a variable that is discarded from the shared memory following execution of a PEG, in order to free space for a variable needed in the next PEG. A variable marked with a bold frame denotes a cache hit, i.e., a variable that is already present in the cache and need not be fetched from the device memory. For example, in preparation for executing PEG P2 it is not necessary to fetch variable B from the device memory, since it is already present in the shared memory from the previous PEG.

A region 254 at the bottom of the figure shows the content of shared memory 52 at the beginning of each PEG. For example, at the beginning of PEG P1 the shared memory holds variables A and B. Variable C is fetched at the beginning of PEG P2, and the shared memory thus holds variables A, B and C. The cache does not change during PEG P3. PEG P4, however, needs variable D as input. Therefore, variable A is discarded at the end of PEG P3 and variable D is fetched at the beginning of PEG P4. The process continues throughout the PEG sequence execution.

For each variable that is present in the shared memory at a given time, the compiler records the identity of the next PEG in the sequence that will request this variable as input. The compiler typically determines these PEG identities by scanning the PEG sequence according to the execution order. The recorded PEG identities are shown in region 254 at the bottom of the figure. For example, when variables A and B are fetched at the beginning of PEG P1, the compiler notes that variable A will be requested next by PEG P3, and that variable B will be requested next by PEG P2. As another example, at the beginning of PEG P3, the compiler notes that variable A will be requested next by PEG P5, and variables B and C will both be requested next by PEG P4. A symbol $\infty$ indicates a variable that will not be requested by any of the subsequent PEGs in the sequence.

Using these records, the compiler decides which variable is to be discarded when space is to be freed in the shared memory. When a variable needs to be discarded, the compiler typically selects to discard the variable which will be requested by a PEG that is furthest away in the sequence, i.e., has a largest distance from the current PEG. Consider, for example, the situation at the end of PEG P3. At this point in time, the shared memory holds variables A, B and C. One of these variables needs to be flushed out in order to enable fetching of variable D for PEG P4. Since variable A will be requested by PEG 5 and variables B and C will be requested earlier by PEG P4, variable A is discarded.

The example of FIG. 9 refers to a specific sequence, specific variables and a specific cache size. Generally, however, this cache management scheme can be used with any other suitable PEG sequence, set of variables and cache size. In alternative embodiments, the compiler may design the caching-in and caching-out of variables in shared memory 52 using any other suitable criterion. The multiprocessor 40 that is assigned by the GPU to execute a given PEG sequence fetches variables from device memory 56 to shared memory 52 according to the deterministic pattern set by the compiler. Typically, a similar process is carried out for each PEG sequence in the SID. The compiler may use any suitable data structures for recording the PEGs that will request the different variables.

In some embodiments, the compiler aggregates the fetching of multiple variables from device memory 56 into shared memory 52 in a single fetch command, so as to reduce the number of costly fetch operations from the device memory. As noted above, in a typical GPU the overhead of fetching a single variable from the device memory is similar to the overhead of fetching variables that occupy 512 bits, and therefore it is advantageous to aggregate and fetch a large number of variables in a single command.

Figure 10A:
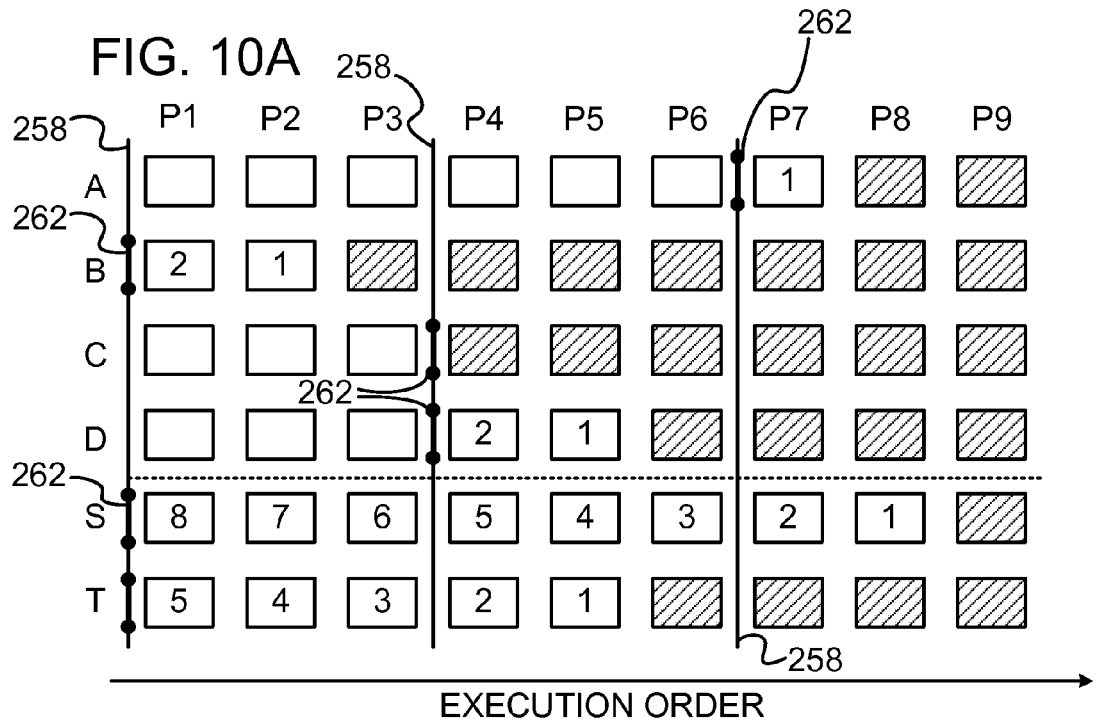
FIGS. 10A and 10B are diagrams that schematically illustrate a variable pre-fetching scheme, in accordance with an embodiment of the present invention.
Figure 10B:
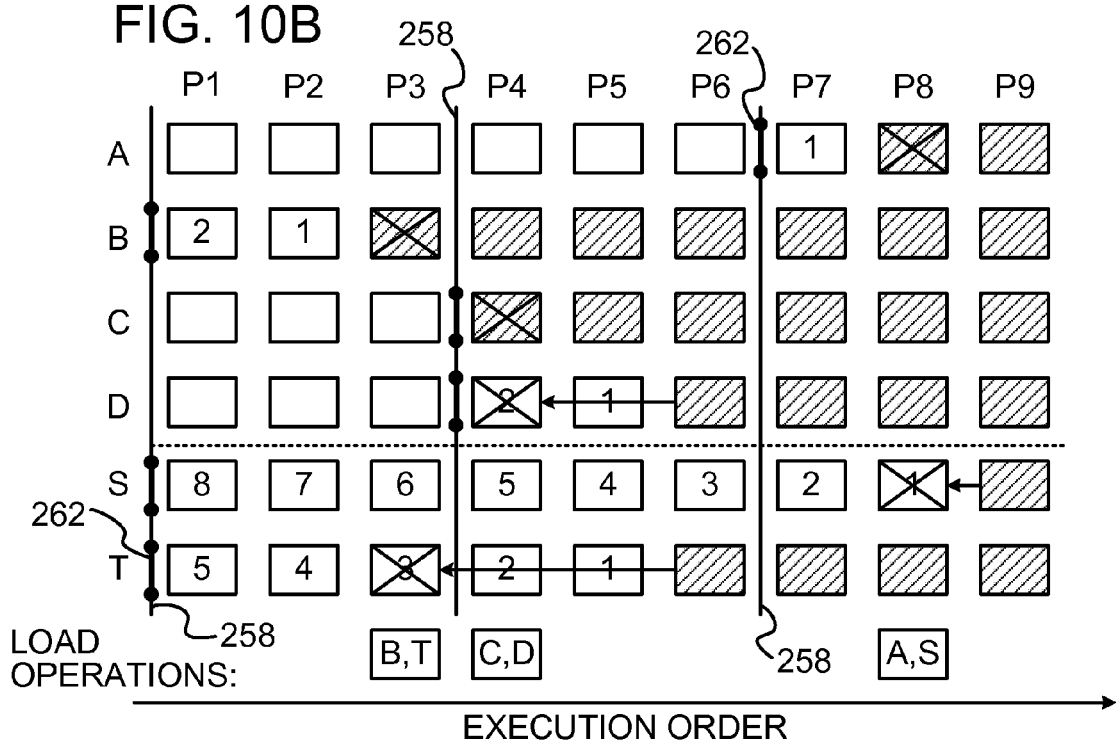

FIGS. 10A and 10B are diagrams that schematically illustrate a variable pre-fetching scheme, in accordance with an embodiment of the present invention. The present example refers to a PEG execution sequence, which comprises nine PEGs denoted P1 ... P9. The PEGs use as input six variables denoted A ... D, S and T. Variables A ... D are used internally to the present SID, whereas variables S and T comprise inter-SID variables. In each of FIGS. 10A and 10B, each column corresponds to a certain PEG in the sequence, and each row corresponds to a certain variable.

Each variable is marked with a shaded pattern from the point this variable is requested as input by a certain PEG. For example, variable B is first requested by PEG P3, and therefore this variable is marked with a shaded pattern from PEG P3 onwards. Vertical lines 258 indicate SYNCs between the present PEG sequence and some other sequence or sequences, which are carried out by the subsequent PEGs. In the present example, SYNCs are carried out by PEGs P1, P4 and P7. For each SYNC 258, one or more marks 262 indicate the specific variables that are synchronized by the SYNCs. For example, the SYNC carried out by PEG P4 halts execution until variables C and D are ready by another sequence.

In some embodiments, the compiler scans the PEG sequence and sets the timing of device memory fetch commands, as well as the variables that are fetched by each command. Typically, the compiler attempts to set the timing and content of the fetch commands while considering (1) the distances to the PEGs that will need each variable, and (2) a number of fetch operations per command that is considered efficient. Based on this information, the compiler attempts to combine fetching of two or more variables in a single command.

In some embodiments, the compiler scans the PEG sequence in reverse order (i.e., opposite of the execution order). For each variable, the compiler marks a respective fetching interval, i.e., a time interval during which the variable can be fetched. This time interval begins at the time the variable becomes valid, and ends at the PEG that first requests this variable as input. The compiler then sets the timing and content of the fetch operations based on these time intervals.

Typically, for each variable and for each PEG, the compiler marks the distance (in PEG units) of the PEG from the PEG that will first request this variable, as long as the variable is valid. A given variable can be assumed valid following the latest SYNC 258 that is associated with this variable. The distances marked by the compiler in the present example are shown in FIGS. 10A and 10B. For example, variable D is first requested by PEG P6, and may be fetched anytime starting from PEG P4 (following the SYNC that waits on this variable). The compiler sets the timing and content of the fetch operations based on the marked distances. For example, the compiler may scan the PEG sequence along the execution order, identify variables that need to be fetched, and combine them with fetching of other variables in order to produce efficient fetch commands. The compiler may combine two or more variables whose fetching intervals overlap. The combined fetch command is positioned during this overlap.

Assume, for example, that a command that fetches two variables is considered efficient, but a command that fetches only a single variable is not. In the example of FIG. 10B, no variables need to be fetched in preparation for PEGs P1 and P2. PEG P3, however, needs variable B as input, and therefore the compiler defines a fetch command from device memory 56 to take place in preparation for PEG P3. In order to access the device memory efficiently, the compiler aggregates another variable fetching in the same command. The compiler selects the valid variable whose distance from the current PEG (i.e., the distance from the current PEG to the PEG that will first request this variable) is minimal.

In the present example, variables S and T are valid at this time, and variable T has a smaller distance (3 compared to 6). Therefore, the compiler defines the fetch command so as to fetch variables B and T. Once these variables are fetched, they are crossed out from the list so that they will not be fetched again. The process continues using similar logic, and the compiler defines two additional fetch commands—one that fetches variables C and D before PEG P4, and another that fetches variables A and S before PEG P9. Using this technique, each variable is fetched after it becomes valid and before it is first needed as input, and the fetch commands are defined efficiently by aggregating the fetching of multiple variables per command.

The example of FIGS. 10A and 10B refers to a specific sequence, specific variables, a specific number of fetches per command and a specific selection criterion. Generally, however, the compiler may apply a pre-fetching scheme having any other suitable PEG sequence, variables, number of fetches per command and/or selection criterion. Typically, a similar process is carried out for each PEG sequence in the SID. The compiler may use any suitable data structures for recording the time intervals and distances described above.

In some embodiments, the compiler delays the storage of variables (outputs produced by the PEGs) in device memory 56, and aggregates multiple variables per storage command. Storing multiple variables per command reduces the latency and overhead associated with storage in device memory 56. A delayed storage mechanism of this sort can be carried out using similar criteria to the pre-fetching mechanism of FIGS. 10A and 10B. For example, the compiler may identify, for each variable, the time interval from the PEG that produced the variable value until the point the variable is needed as input (e.g., by a PEG in another sequence, which possibly belongs to a different SID). When the variable is needed as input by a sequence in another SID, the compiler may regard the end of the sequence producing this variable (and not the individual PEG within this sequence) as the time at which the variable is ready. The compiler may then define multi-variable storage commands based on these time intervals.

As shown in FIG. 9 above, when a given multiprocessor 40 executes a given PEG sequence, the multiprocessor loads variables from device memory 56 in a particular deterministic order, caches them in the shared memory and provides them as input to the different PEGs in the sequence. In some embodiments, the compiler pre-orders the variables in device memory 56 according to the order in which the PEG sequence will load them. When using this mechanism, a given PEG sequence can fetch variables from device memory 56 using an ordered sequence of fetch operations to successive memory addresses.

Figure 11:
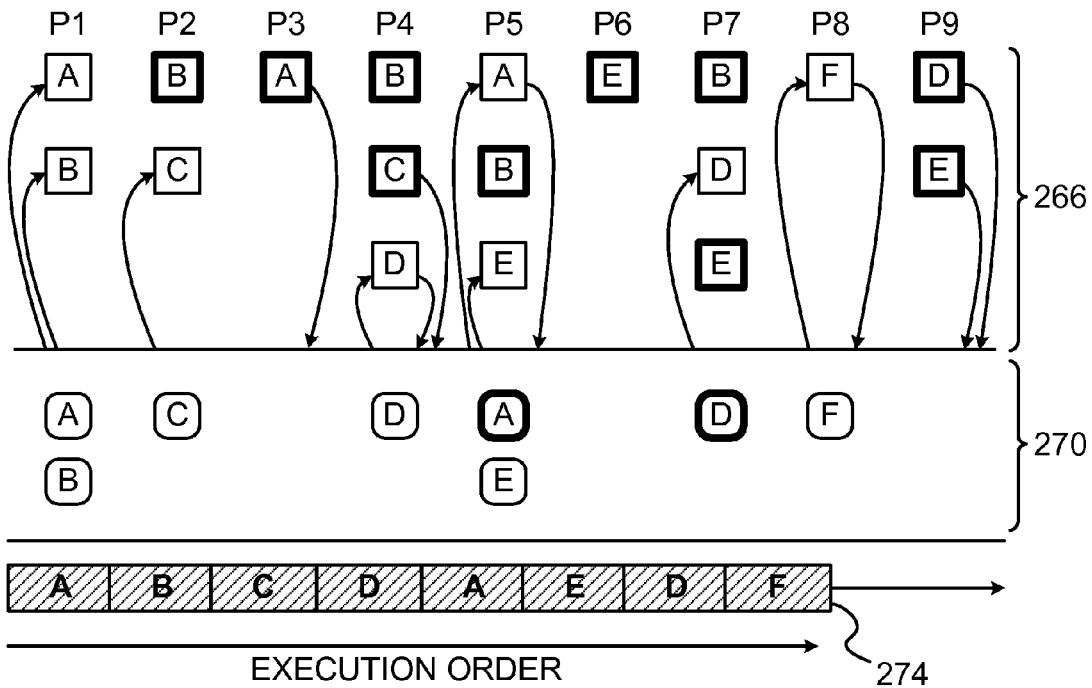
FIG. 11 is a diagram that schematically illustrates a variable pre-ordering scheme, in accordance with an embodiment of the present invention.

FIG. 11 is a diagram that schematically illustrates a variable pre-ordering scheme, in accordance with an embodiment of the present invention. The example of FIG. 11 shows the caching mechanism of FIG. 9 above. A region 266 at the top of the figure shows the variables cached into and flushed out of shared memory 52 by the different PEGs in the sequence. A region 270 shows the variables that are fetched from device memory 56 in preparation for each PEG. A bold frame marks a variable that was already read by a previous PEG in the sequence, but was flushed out of the shared memory in the interim.

In some embodiments, the compiler stores the variables in device memory 56 in a feeder region 274. In feeder region 274 of a certain PEG sequence, the variables are stored in the order in which they will be fetched by that PEG sequence. Note that a given variable may be stored at two or more different locations along the feeder region, since the PEG sequence may re-read variables due to the limited cache size. Note also that each PEG sequence has a corresponding feeder region in device memory 56. A given variable may be stored in multiple feeder regions of different PEG sequences.

Typically, the pre-ordered variables are arranged in the device memory in basic sections that conform to the GPU's memory alignment and size specifications. These sections are referred to herein as cache-lines. In a typical GPU, each cache-line comprises 512 bits. Typically, PEGs in different sequences produce, consume and exchange variables in cache-line units.

Inter- and Intra-SID Communication

As explained above, the compiler converts each dependency sub-tree into a SID. In some embodiments, variables that are produced by a PEG in one SID are used as input by a PEG in another SID. Communication between PEGs in different SIDs is typically carried out via device memory 56. In some embodiments, the compiler stores variables that are communicated between SIDs in data structures called mailboxes. Each mailbox comprises variables that are generated and/or used by common PEG sequences. Communication between SIDs is carried out by writing and reading cache-lines to and from mailboxes. Thus, access to device memory 56 is carried out efficiently by exploiting the usage and generation commonality between different variables.

Figure 12:
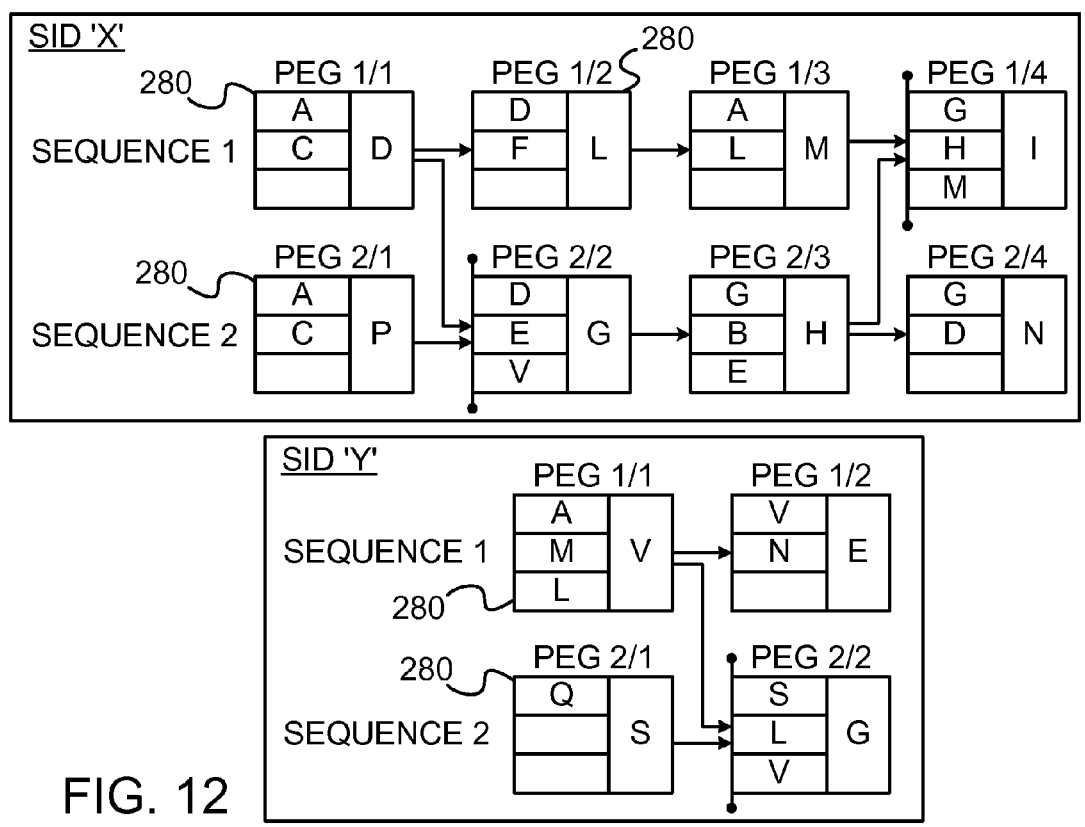
FIG. 12 is a diagram that schematically illustrates multiple SIDs, in accordance with an embodiment of the present invention.

FIG. 12 is a diagram that schematically illustrates multiple SIDs, in accordance with an embodiment of the present invention. The present example shows two SIDs denoted SID-X and SID-Y. SID-X comprises two PEG sequences, each comprising four PEGs 280. SID-Y comprises two PEG sequences, each comprising two PEGs 280. Each PEG accepts as input up to three input variables (which are shown on the left-hand-side of its respective block) and produces an output variable (which is shown on the right-hand-side of its respective block). PEG 1/1 in SID-X, for example, accepts variables A and C as input and generates variable D. Some dependencies between sequences may also exist within each SID, such as between PEG 2/3 and PEG 1/4 in SID-X.

Certain variables are defined as ingress and egress variables, i.e., variables that are input from and output to the CPU (or other host environment), respectively. In the present example, the ingress variables comprise variables A, B, C, F and Q. The egress variables comprise variables S, G, H and P.

In a given SID, the variables can be classified into generated variables (which are generated by the SID), used variables (which are used as input by the PEGs in the SID) and input variables (which are used as input by the PEGs in the SID but are not produced internally in the SID). Overlap may sometimes exist between the different classes. In the present example, the variable classification is shown in the following table:

| SID | X | Y |
|---|---|---|
| Generated variables | D, L, G, M, H, I, N, P | V, S, E, G |
| Used variables | A, B, C, D, E, F, G, L, H, M, V | A, M, L, Q, V, N, S |
| Input variables | A, B, C, E, F, V | A, M, L, Q, N |

Figure 13:
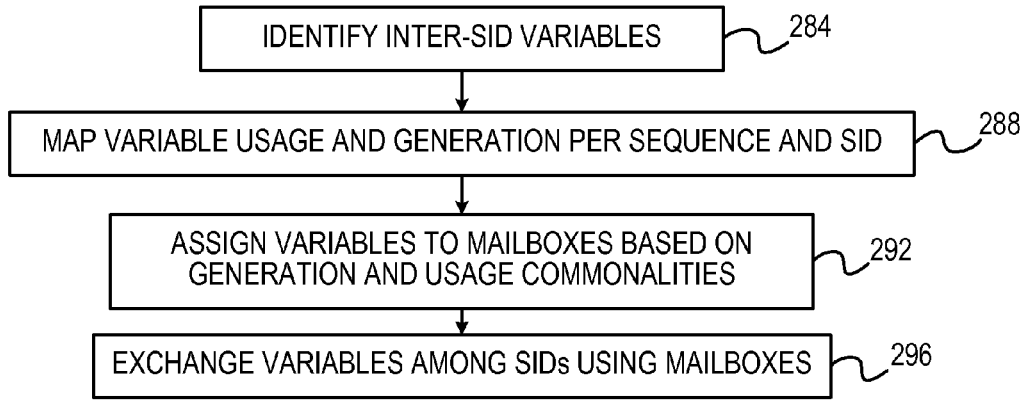
FIG. 13 is a flow chart that schematically illustrates a method for inter-SID communication, in accordance with an embodiment of the present invention.

FIG. 13 is a flow chart that schematically illustrates a method for inter-SID communication, in accordance with an embodiment of the present invention. The method begins with the compiler identifying a set of inter-SID variables, at an inter-SID identification step 284. The inter-SID variables comprise those variables that are not ingress or egress variables, and that are to be exchanged between different SIDs. The compiler may identify the inter-SID variables by (1) identifying the set of all input variables of all SIDs, and (2) removing the ingress and egress variables from this set. In the present example, the set of input variables of SIDs X and Y is {A, B, C, E, F, M, L, Q, N, V, P}, the set of ingress variables is {A, B, C, F, Q} and the set of egress variables is {S, G, H, P}. Thus, the set of inter-SID variables is {E, M, L N, V}.

Then, the compiler maps the inter-SID variables in terms of their usage and generation by the different PEG sequences of the different SIDs, at a usage/generation mapping step 288. In the present example, the usage and generation of the different inter-SID variables is given in the following table:

| Variable usage | Variable generation |
|---|---|
| E ← (X2) | E → (Y1) |
| M ← (Y1) | M → (X1) |
| L ← (Y1, Y2) | L → (X1) |
| N ← (Y1) | N → (X2) |
| V ← (X2) | V → (Y1) | wherein M→(X1) denotes that variable M is generated by sequence 1 in SID-X, for example. Generally, a given inter-SID variable may be generated and/or used by any desired number of sequences belonging to any desired number of SIDs.

The compiler then groups together inter-SID variables that are generated by common sequences and used by common sequences, at a grouping step 292. The compiler defines a data structure, referred to as a mailbox, for each such group. The mailboxes are stored in a certain region in device memory 56. Each mailbox typically comprises one or more cache-lines. In the present example, the compiler may define the following four mailboxes:

| Mailbox # | Inter-SID variables | Usage/generation sequences |
|---|---|---|
| 1 | E, V | (Y1) → (X2) |
| 2 | M | (X1) → (Y1) |
| 3 | L | (X1) → (Y1, Y2) |
| 4 | N | (X2) → (Y1) |

At runtime, different SIDs communicate with one another by writing cache-lines to the mailboxes and reading cache-lines from the mailboxes, at an inter-SID communication step 296. Since each mailbox comprises inter-SID variables that are generated by the same sequences and used by the same sequences, access to device memory 56 is efficient.

The efficiency of the mailbox mechanism depends, at least partially, on the allocation of PEs to PEG sequences within each SID. As explained in FIG. 8 above, the compiler attempts to group in the same PEG sequence PEs that communicate with the same PEs in other SIDs. If this grouping is successful and well-defined, the method of FIG. 13 will produce a relatively small and well-defined group of mailboxes, with each mailbox containing a relatively large number of variables.

In some embodiments, the compiler can further improve the efficiency of accessing device memory 56 by ordering the variables inside each mailbox according to the order in which they are requested by the PEG sequences.

In some embodiments, different PEG sequences within the same SID may transfer variables to one another. This form of communication is referred to herein as intra-SID communication. PEG sequences within the same SID typically communicate by exchanging cache-lines comprising variable values via device memory 56. Intra-SID communication is typically subject to variable validity constraints. In other words, a certain PEG sequence may transfer a variable to another sequence only after the PEG producing the variable has completed execution. In some embodiments, the compiler defines communication transactions between PEG sequences, in a manner that preserves the execution dependencies and minimizes the number of transactions (in cache-line resolution). Intra-SID communication is typically carried out over the SYNC elements introduced between sequences. In other words, a SYNC element, which halts execution of one sequence until one or more PEGs in other sequences finish execution, may also transfer variables from these other sequences to the halted sequence.

Figure 14A:
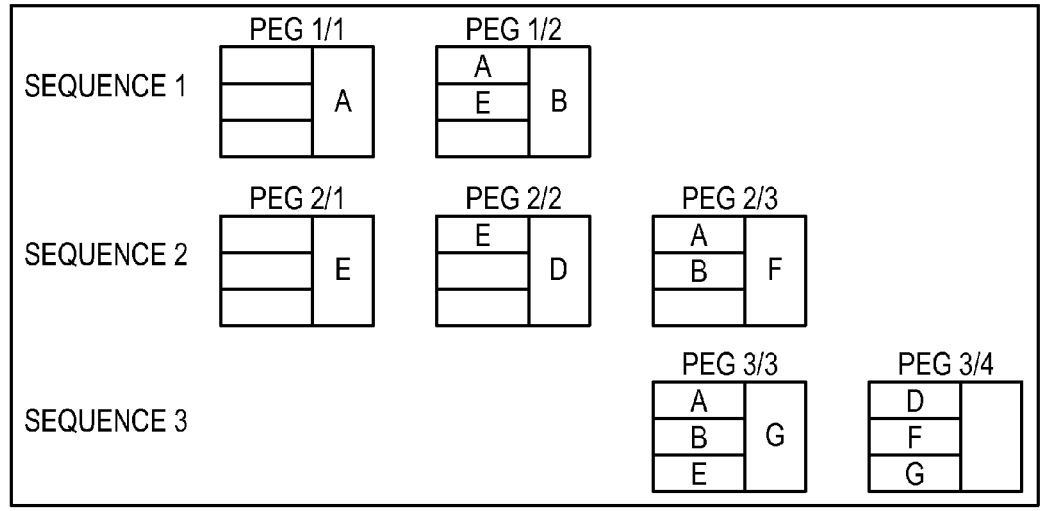
FIGS. 14A and 14B are diagrams that schematically illustrate an intra-SID communication scheme, in accordance with an embodiment of the present invention.
Figure 14B:
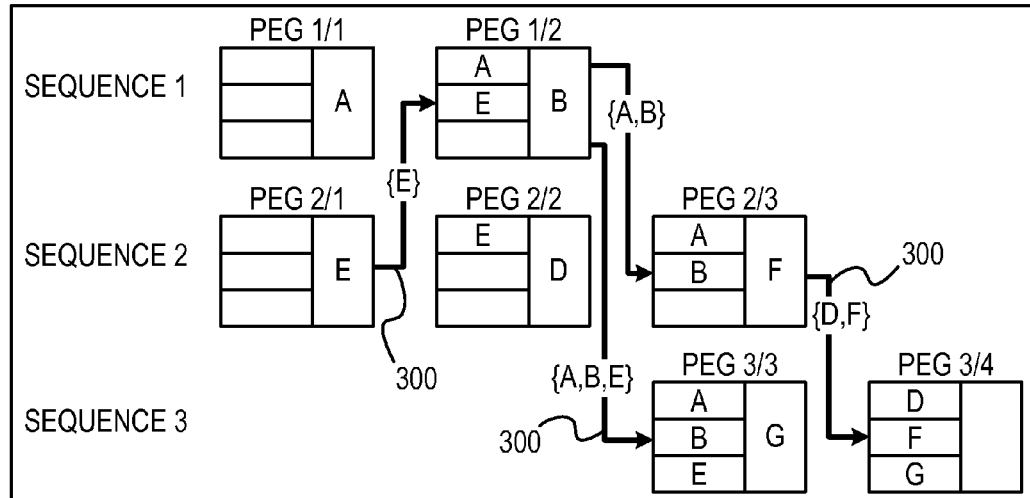

FIGS. 14A and 14B are diagrams that schematically illustrate an intra-SID communication scheme, in accordance with an embodiment of the present invention. FIG. 14A shows an example SID having three PEG sequences. For each PEG, the input variables are shown on the left-hand-side of the PEG block and the output variable is shown on the right-hand-side of the block.

FIG. 14B shows four cache-lines 300, which are defined by the compiler for transferring variables between PEG sequences in the SID of FIG. 14A. The variables passed by each cache-line are marked in brackets in the figure. The compiler may use any suitable process, such as various dynamic programming techniques, for defining cache-lines 300. Typically, the solution is not unique and multiple solutions are feasible. The compiler attempts to identify the solution that meets a predefined criterion, such as minimizing the number of cache-lines 300.

Techniques for Improving Inter-SID Communication Efficiency

As described above, exchanging of inter-SID variables between different SIDs is carried out by storing the variables in mailboxes in device memory 56. Each mailbox comprises one or more cache-lines, and is associated with a set of one or more source execution sequences (in one or more source SIDs) and a set of one or more target execution sequences (in one or more target SIDs). Typically, the inter-SID variables are assigned to mailboxes such that (1) variables that are generated and used by the same set of SIDs and execution sequences are assigned to the same mailbox, (2) variables that are not generated and used by the same set of SIDs and sequences are assigned to separate mailboxes, so as not to share the same cache-line, and (3) each variable appears exactly once within the collection of mailboxes.

In some cases, however, the generation and usage of inter-SID variables does not enable efficient grouping of the variables into mailboxes. Such grouping may produce mailboxes having a small number of variables. Since the device memory is read in cache-line units regardless of the actual number of variables residing in the cache-lines, mailboxes having few variables may cause poor cache-line utilization.

In some embodiments, the compiler combines two or more inter-SID cache-lines from sparsely-populated mailboxes, to produce densely-populated cache-lines. By combining cache-lines, the number of load operations from the device memory may be reduced. The extent of reduction depends on the choice of cache-lines to be combined. For example, the compiler may attempt to combine inter-SID cache-lines having relatively large overlap in the set of target execution sequences.

Consider, for example, a cache-line A that is used by sequences S1 and S2, and a cache-line B that is used by sequences S1, S2 and S3. Assume also that cache-lines A and B are sufficiently sparse, so that it is possible to combine them into a new cache-line C without exceeding the cache-line size limitation. In this example, after combining cache-lines A and B to form cache-line C, each of sequences S1 and S2 will have to load only a single cache-line (the combined cache-line C) instead of two cache-lines. Sequence S3 will still have to load a single cache-line (cache-line C instead of cache-line B). Overall, the number of load operations from the device memory is reduced as a result of combining Cache-lines A and B. In alternative embodiments, the compiler may combine any desired number of cache-lines.

Alternatively, the compiler may combine inter-SID cache-lines whose variables can be transported between target execution sequences in the target SID using intra-SID communication mechanisms (i.e., using the synchronization elements between sequences). The concept of exploiting under-used intra-SID communication resources for improving inter-SID communication is described in detail further below. Consider, for example, a configuration of three execution sequences S1, S2 and S3, and three cache-lines A, B and C. In this example, sequence S1 has input variables from cache-line A, sequence S2 has input variables from cache-line B, and sequence S3 has input variables from cache-line C. Assume also that the synchronization mechanisms between the sequences enables data transfer from sequence S1 to sequence S2. Within sequence S2, input variables from cache-line B are needed only by PEGs that are positioned after the synchronization with sequence S1. In this situation, it is advantageous to combine cache-line A with cache-line B, and to transfer the variables of cache-line B over the synchronization mechanism between sequence S1 and sequence S2. When using such a scheme, sequence S2 does not need to load cache-line B, since it receives its variables from sequence S1 over the synchronization mechanism. Thus, the compiler may reduce the number of load operations from the device memory by (1) combining cache-lines used by different target sequences, and (2) transferring variables from one target sequence to another using intra-SID communication.

Regardless of whether inter-SID cache-lines are combined or not, the compiler may reduce the number of inter-SID cache-line load operations from the device memory by exploiting under-used intra-SID communication resources, as explained in the following description.

Figure 15:
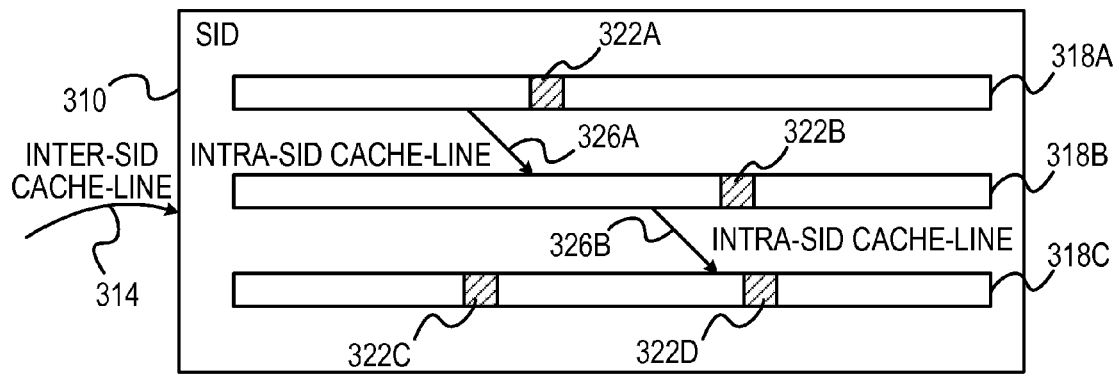
FIG. 15 is a diagram that schematically illustrates a SID that uses inter-SID and intra-SID communication, in accordance with an embodiment of the present invention.

FIG. 15 is a diagram that schematically illustrates a SID 310 that uses both inter-SID and intra-SID communication, in accordance with an embodiment of the present invention. SID 310 receives inter-SID variables from another SID by loading an inter-SID cache-line 314. In the present example, intra-SID variables from cache-line 314 are used by three execution sequences 318A . . . 318C in SID 310. (SID 310 may well comprise additional execution sequences that do not use variables from this inter-SID cache-line.)

Without using intra-SID resources to transfer inter-SID variables, each of the three sequences 318A . . . 318C would need to load cache-line 314 separately from the appropriate mailbox in device memory 56, in order to obtain its input variables. Thus, three separate load operations would be required. Alternatively, cache-line 314 may be loaded by only a subset of the sequences (e.g., by a single sequence), and the other sequences may receive the variables using intra-SID communication.

In SID 310, for example, a SYNC 326A synchronizes a certain PEG in sequence 318B to a certain PEG in sequence 318A, and a SYNC 326B synchronizes a certain PEG in sequence 318C to a certain PEG in sequence 318B. Each SYNC is associated with an intra-SID cache-line, which depends on the SYNC and transfers variables from the synchronizing sequence or sequences to the synchronized sequence (or, more accurately, from the synchronizing PEG or PEGs to the synchronized PEG). For example, SYNC 326A is associated with an intra-SID cache-line that transfers variables from sequence 318A to 318B.

Assuming the intra-SID cache-lines have free unallocated bandwidth, they can be used to transfer data from sequence 318A to sequence 318B and from sequence 318B to sequence 318C. Thus, in some cases all three sequences 318A . . . C may obtain the variables of inter-SID cache-line 314 by having only sequence 318A actually load the cache-line from the device memory, and then transfer the variables over the intra-SID cache-lines that depend on SYNCs 326A and 326B to sequences 318B and 318C.

Note that this solution is feasible assuming that, in a given sequence, the PEGs that use the inter-SID variables are located after the SYNC whose intra-SID cache-line is used for transferring the variables to that sequence. A PEG 322A in sequence 318A has access to the inter-SID variables since sequence 318A is the sequence that actually loads the inter-SID cache-line from device memory 56. In sequence 318B, a PEG 322B has access to the transferred variables because it is located after SYNC 326A. In sequence 318C, a PEG 322D has access to the transferred variables since it is located after SYNC 326B. A PEG 322C, on the other hand, does not have access to the transferred variables since it is located before SYNC 326B.

If PEG 322C needs to use variables from inter-SID cache-line 314, then sequence 318C needs to load this inter-SID cache-line separately, incurring an additional load operation. In this scenario, the intra-SID cache-line of SYNC 326B will not be used for variable transfer from inter-SID cache-line 314.

In some embodiments, the compiler attempts to reduce the number of inter-SID cache-line load operations that are performed by a given SID, by assigning available resources over intra-SID SYNCs for carrying inter-SID variables. This process is typically performed for each SID. An example process of this sort is described in FIGS. 16 and 17 below. Alternatively, however, any other suitable process can also be used.

Figure 16:
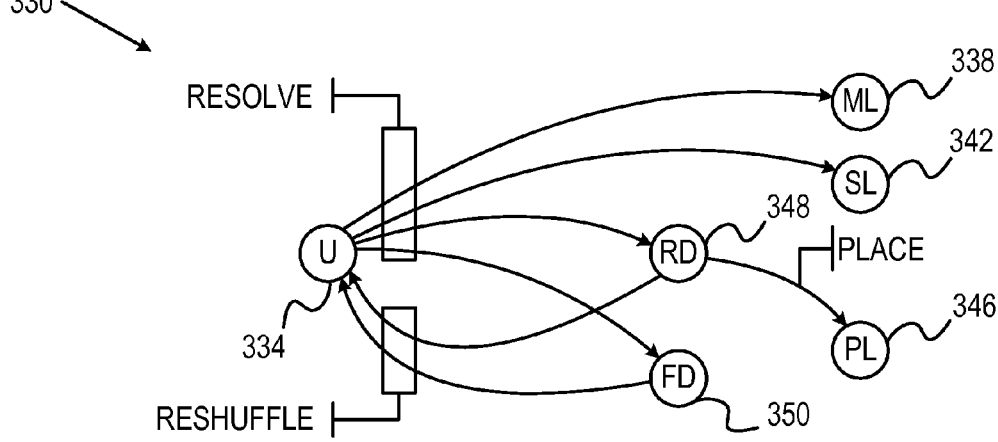
FIG. 16 is a state diagram that schematically illustrates a method for reducing inter-SID communication, in accordance with an embodiment of the present invention.
Figure 17:
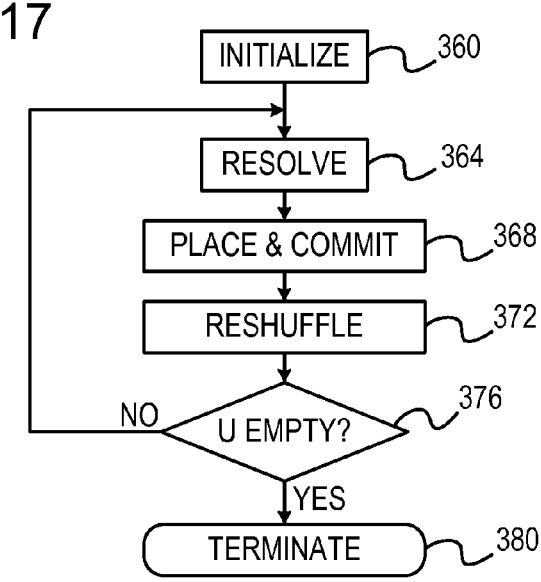
FIG. 17 is a flow chart that schematically illustrates a method for reducing inter-SID communication, in accordance with an embodiment of the present invention.

The process of FIGS. 16 and 17 uses two functions denoted F and P. For a given execution sequence s and an inter-SID variable a, function F(s,a) is a static function that returns the first entry (PEG) in sequence s that uses variable a as input. In other words, variable a should be provided to the shared memory of sequence s no later than F(s,a). If variable a is not used as input anywhere in sequence s, then $F(s,a)=\infty$.

Function P(s_seq, s_off, t_seq, t_off, req_size) returns a set of (one or more) paths through the SID, over which data of a given size req_size can be transferred from a source sequence s_seq to a target sequence t_seq. The returned paths begin in the source sequence at offset s_off or later, and reach the target sequence at an offset t_off or earlier. Function P may change during compilation in response to allocation of intra-SID communication resources. In some embodiments, P also receives an array of the variables that need to be used at t_off. Function P typically takes into account that some of the variables have already been transferred via the synchronization between sequences. In some embodiments, P returns a combination of multiple paths that can be used for data transfer.

The process also uses a database denote H. For each inter-SID cache-line used by the SID, database H holds a classification of the sequences that use this cache-line into several classes. The classes are typically represented by respective lists. In the present example, the sequences are classified into six classes:

Must Load (ML): Sequences that must load the cache-line from device memory 56 because they cannot receive the inter-SID variables over intra-SID SYNCs.

Should Load (SL): Sequences that are requested by the process to load the cache-line from device memory 56, even though they are not ML sequences.

Placed (PL): Sequences that are to receive the inter-SID variables from other sequences without loading the cache-line, and for which appropriate resources have been allocated over the intra-SID cache-lines.

Root Dependent (RD): Sequences that are not yet assigned to the SL, ML or P classes, and which can be reached via intra-SID cache-lines at least one sequence in the SL, ML or PL classes.

Far Dependent (FD): Sequences that cannot be reached by any of the sequences in the SL, ML or PL classes.

Unresolved (U): Sequences whose class is still unresolved. (The difference between classes FD and U is that sequences in class FD can be reached from sequences in class RD or FD, but cannot yet be reached from sequences in the SL, ML or PL classes.)

The description that follows refers to a given inter-SID cache-line, which has an associated classification of sequences into classes. The process described below is typically repeated for each inter-SID cache-line.

At any given time, each class may comprise any number of sequences, but a given sequence may appear in only one class. As noted above, only the sequences that use variables from the inter-SID cache-line in question are classified. The process of FIGS. 16 and 17 is an iterative process, which starts with all sequences in the U class. (Typically, the U class initially contains only the sequences that use variables carried over the inter-SID cache line in question. Other sequences are typically ignored.) The process ends with class U empty, all sequences assigned to the SL, ML or P classes. When the process ends, each sequence in the ML and SL classes is defined to load the inter-SID cache-line individually, and the sequences in the P class are defined to receive the inter-SID variables from other sequences without loading the cache-line. Appropriate resources of the intra-SID SYNCs are assigned to deliver the inter-SID variables to the sequences in the P class.

FIG. 16 is a state diagram 330 that schematically illustrates a method for reducing inter-SID communication, in accordance with an embodiment of the present invention. State diagram 330 comprises states 334, 338, 342, 346, 348 and 350, which represent the U, ML, SL, P, RD and FD classes, respectively. Transitions between states are marked by arrows in the figure. The iterative allocation process moves sequences from class to class (from state to state) over these transitions, until class U is empty and all sequences reach the ML, SL or P classes.

FIG. 17 is a flow chart that schematically illustrates a method for reducing inter-SID communication, in accordance with an embodiment of the present invention. (The process is typically repeated for each inter-SID cache-line.) The method begins with the compiler initializing database H, at an initialization step 360. The currently-processed inter-SID cache-line is denoted c. For each sequence s that uses cache-line c (i.e., a sequence that satisfies $F(s,c)\neq\infty$), the compiler adds the sequence to class U.

The compiler then attempts to resolve cache-line c, i.e., to classify the sequences in U, using functions S and P, at a resolving step 364. The resolving step comprises several stages that are performed in succession, as follows:

1) ML resolving stage: For each sequence s in class U, the compiler checks if the variables of cache-line c used by sequence s can be obtained from another sequence that uses this cache-line. (Possible sequences for providing the variables are identified using function F. Possible paths for transferring the variables are identified using function P.) If no sequence and path are found for obtaining the variables to sequence s, the compiler removes sequence s from the U class and adds it to the ML class.

2) RD resolving stage: For each sequence s in class U, the compiler identifies (using F and P) sequences that can obtain the variables they need from cache-line c from a sequence in the ML, SL or PL classes. The compiler removes the identified sequences from class U and adds them to class RD.

3) The compiler repeats the following three sub-stages until class U is empty:
   a) RD sub-stage: Using functions F and P, the compiler identifies sequences that can obtain the variables they need from cache-line c from a sequence in class SL. The compiler removes these sequences from class U and adds them to class RD.
   b) FD sub-stage: Using functions F and P, the compiler identifies sequences that can obtain the variables they need from cache-line c from a sequence in class RD or FD. The compiler removes these sequences from class U and adds them to class FD. If at least one sequence was found, the FD sub-stage is repeated.
   c) SL sub-stage. This stage of the process identifies and resolves cyclic dependency patterns among two or more of the sequences. A detailed example of a cyclic dependency is described in section 10.3.1.2.4 of U.S. Provisional Patent Application 61/185,609, cited above.
      1. The compiler selects a sequence s in class U list of cache-line c. A variable denoted req_offset is set to F(s,c).
      2. Using function P, the compiler scans sequences in class U (other than sequence s) and attempts to identify source sequences that can provide the variables of cache-line c needed by sequence s at an offset that is not later than req_offset.
      3. If a source sequence ss is found, s is set to be s=ss, and req_offset is set to be the offset in which ss needs to have the cache-line c available. The process loops back to step 2 above.
      4. If no source sequence is found, the compiler removes sequence s from class U and adds it to the SL class.

After completing resolving step 364, for a given inter-SID cache-line c, class U is empty and the sequences that use cache-line c are classified to classes ML, SL, RD and FD. The sequences in the ML and SL classes are defined as loading cache-line c individually from device memory 56, and this definition will not change by subsequent iterations of the process.

The compiler now attempts to allocate intra-SID resources for providing the inter-SID variables to the sequences in the RD class, at a placement step 368. Typically, as long as there are sequences remaining in any of the RD class lists in database H, the compiler performs the following process for a given inter-SID cache-line c:

1) From among the sequences in the RD class of cache-line c, the compiler selects the sequence s having the smallest data size it needs from this cache-line. The compiler chooses (using function P) a path p (or a combination of multiple paths), which uses a minimum amount of Intra-SID cache-line resources to deliver the required variables to sequence s from sequences that already possess these variables. Note that if path p traverses more than one hop (i.e., reaches sequence s via one or more intermediate sequences) then the resources over these multiple Intra-SID cache-lines along the path should be taken into account.

2) If no suitable path p is found, step 368 terminates.

3) If a suitable path p is found, the compiler removes sequence s from class RD and adds it to class PL.

4) The compiler commits (allocates) usage of Intra-SID cache-lines over path p to transport the inter-SID variables of cache-line c that are required by sequence s. The compiler refreshes function P to reflect possible changes in possible paths due to the newly-allocated resources.

At this stage, the compiler typically committed intra-SID communication resources to some of the sequences in class RD, and moved them to class PL accordingly. For the sequences remaining in class RD, the compiler did not succeed in finding a path with available resources for providing them with the necessary inter-SID variables.

The compiler now reshuffles the sequences in classes RD and FD, at a reshuffling step 372. In this step, the compiler moves all the sequences in the RD and FD classes (if any remain) to class U. The compiler checks whether class U is empty, at an empty checking step 376. If there are sequences remaining in class U, the method loops back to step 364 above, and the compiler continues to attempt resolving the currently unresolved sequences. If class U is empty, all sequences are classified to classes ML, SL or PL, and the method terminates, at a termination step 380. Each sequence in classes ML and SL will load the inter-SID cache-line individually from the device memory.

Each sequence in class PL will receive the necessary inter-SID variables from other sequences, over a predefined and pre-committed path of one or more intra-SID cache-lines. Thus, when using this technique, the number of inter-SID cache-line load operations from device memory 56 is reduced, and the overall SID execution time is reduced accordingly.

Example Dependency Problem Applications

The methods and systems described herein can be used to solve dependency problems in a wide range of fields and applications. Generally, any computing task that can be represented as a set of Processing Elements (PEs) having execution dependencies, can be parallelized and executed efficiently using the disclosed techniques. The description that follows outlines several example types of dependency problems. The disclosed techniques are in no way limited to these examples, however, and can be used to solve any other suitable type of dependency problem.

In some embodiments, the dependency problem solved by system 20 comprises a task of verifying a hardware design by simulation. This application is addressed in detail in PCT Application PCT/IL2009/000330, cited above. In a typical design verification application, server 24 of FIG. 1 accepts from a user, e.g., a verification engineer, a definition of the design to be simulated. The design is typically accepted as one or more files that are written in a Hardware Description Language (HDL) such as VHDL or Verilog. The server also accepts test-bench definitions, which specify the verification environment of the design. The test-bench specifies external asynchronous events (e.g., clock signals, reset signals and various inputs) that are to be applied to the design. The test-bench also specifies tests that are to be applied to the simulated design. The test bench typically comprises software written in C, Verilog, or in a verification-specific language such as E or System-Verilog.

The compiler running on CPU 28 compiles the test-bench and design to produce simulation code, and then runs the simulation code on CPU 28 and GPUs 32. In particular, the compiler represents the design and test-bench into a dependency graph having PEs and dependencies, extracts a-cyclic sub-graphs from the dependency graph, and generates a SID for each sub-graph. The GPU is then invoked to execute the different SIDs, so as to produce simulation results. The simulation results (e.g., reports as to which tests have passed and which failed, suspected faults, fault locations, and/or any other information that may assist the user in verifying the design) are provided to the user.

Figure 18:
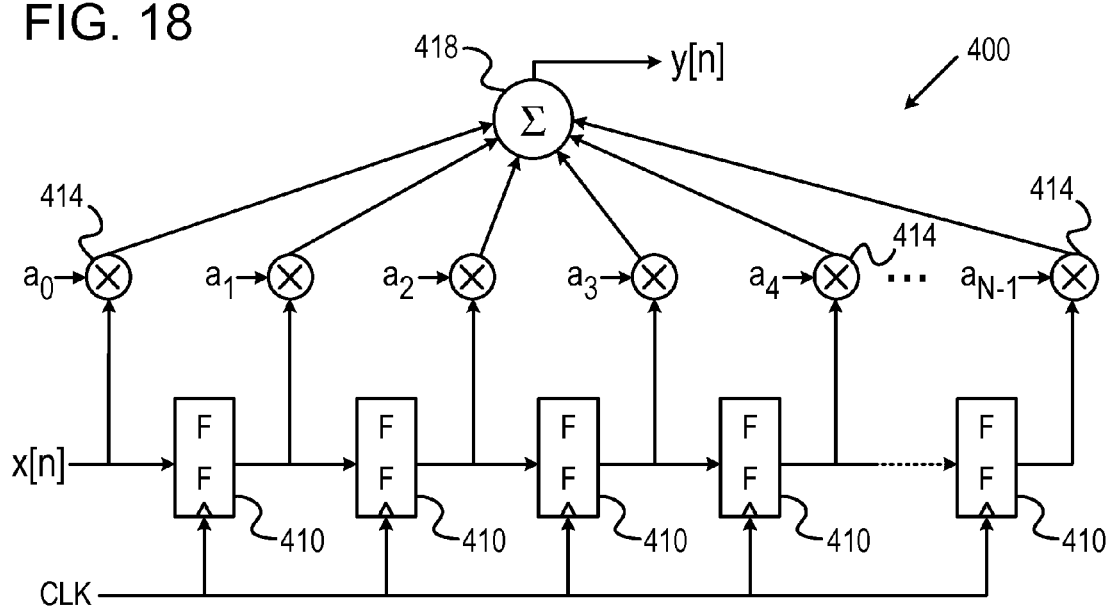
FIG. 18 is a diagram that schematically illustrates a dependency graph representing a digital filter, in accordance with an embodiment of the present invention.
Figure 19:
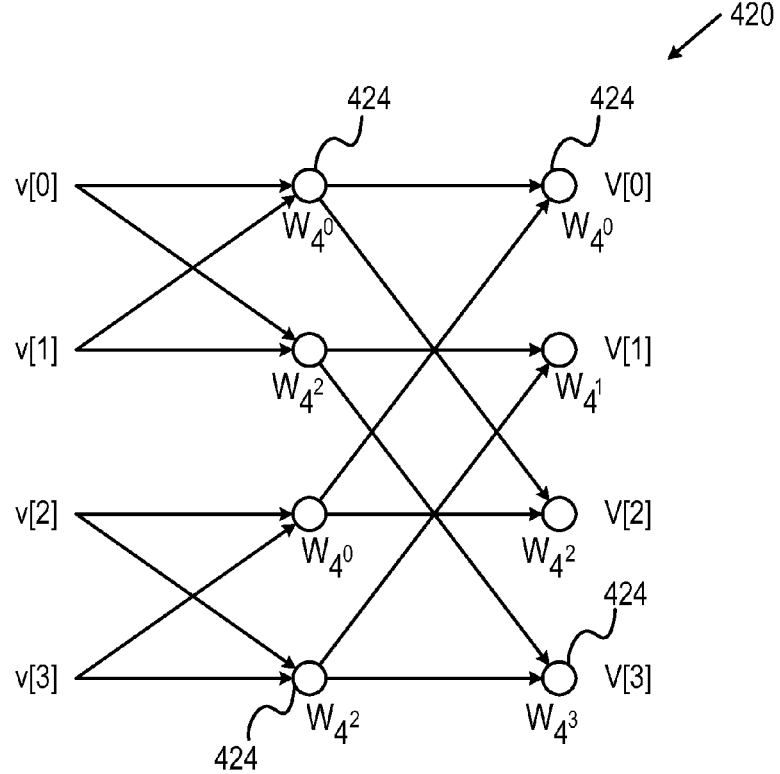
FIG. 19 is a diagram that schematically illustrates a dependency graph representing a Fast Fourier Transform (FFT) computation element, in accordance with an embodiment of the present invention.

Alternatively, the methods and systems described herein can be used to perform computing tasks encountered in applications such as real-time video processing, image processing, Software-Defined Radio (SDR), packet processing in various communication applications and error correction coding. All of these applications typically involve complex computing tasks that can be represented as dependency problems, such as, for example, digital filtering and Fast Fourier Transform (FFT) computation. Such tasks lend themselves naturally to parallelization and solving using the methods and systems described herein. Specific examples of representing a digital filter and an FFT computation element using a dependency graph are shown in FIGS. 18 and 19 below. Once a given computational task (e.g., the examples given herein or any other task) is represented as a dependency graph, it can be parallelized and solved using the methods and systems described herein. As noted above, the dependency graph can be converted to a set of sub-graphs, each sub-graph is compiled to produce a SID, and the GPU executes the SIDs to produce a result.

FIG. 18 is a diagram that schematically illustrates a dependency graph 400 representing a Finite Impulse response (FIR) digital filter, in accordance with an embodiment of the present invention. The digital filter represented by graph 400 filters an input signal x[n] by a set N of filter coefficients denoted $a_0, \ldots, a_{N-1}$, to produce a filtered output signal y[n]. The filter operation is given by $$y[n] = \sum_{i=0}^{N-1} a_i \times [n-i]$$

FIR filters of this sort are common in many signal processing applications, such as in communication receivers and transmitters, image processing applications and medical imaging applications.

Graph 400 comprises several types of PEs, e.g., flip-flop PEs 410 that are synchronized to a common clock signal, multiplier PEs 414 and an adder PE 418. The execution dependencies are shown as arrows in the figure. For example, in a given clock cycle, a given multiplier PE 414 can multiply the output of a given flip-flop PE 410 by the corresponding filter coefficient only after the flip-flop PE completed execution and its output is valid. Other kinds of digital filters, such as Infinite Impulse Response (IIR) filters, can also be represented as dependency graphs in a similar manner.

FIG. 19 is a diagram that schematically illustrates a dependency graph 420 representing a Fast Fourier Transform (FFT) computation element, in accordance with an embodiment of the present invention. FFT computation, as is well-known in the art, can be performed efficiently by a set of basic computation elements, sometimes referred to as "butterflies." dependency graph 420 represents a single computation element. In a typical FFT application, multiple such elements are connected in series and/or in parallel. Dependency graph 420 comprises adder/multiplier PEs 424. Each PE 424 accepts two inputs. When a certain PE input is marked with a weight $W_N^K$, the PE multiplies the input by the weight before adding it to the other input. For example, the PE at the top left of the figures produces an output given by $v[0]+v[1] \cdot W_4^0$. $W_N^K$ is given by $W_N^K = e^{(i2\pi K/N)}$. In a typical implementation of N=4, the weights are given by $W_4^0=1, W_4^1=i, W_4^2=-1$ and $W_4^3=-i$. Alternatively, any other suitable weight values can be used. FFT computation elements of this sort are common in a wide range of applications, such as frequency-domain signal processing and Error Correction Coding (ECC).

Additional Embodiments and Variations

In some embodiments, the compiler applies a process that attempts to merge PEs into PEGs. The output of this process is a graph comprising vertices (representing the PEGs) and edges (representing inter-PEG dependencies). The process typically attempts to group the PEs into PEGs in a way that minimizes the number of inter-PEG dependencies. A grouping of this sort typically results in a SID having less inter-sequence SYNCs. An example merging process is described in section 5.5.1 of U.S. Provisional Patent Application 61/110,676, cited above.

In some embodiments, the compiler attempts to build the SID iteratively, progressing along the PE execution time. In this process, the compiler places the PEs having long Forward Phases (FP) first, and places them in less-populated execution sequences. Moreover, the compiler gives higher priority to placing a PE in a sequence in which it does not require addition of a SYNC. An example SID generation process is described in section 6.3.6 of U.S. Provisional Patent Application 61/110,676, cited above. Generally, the compiler may place the PEs in the execution sequences based on any other criterion or heuristic that considers the FP lengths of the PEs, the occupancy levels of the execution sequences and/or the possible addition of SYNCs.

In some embodiments, the CPU and GPU jointly run an event-driven (EDE) simulator that simulates the dependency problem. Event-driven operation is addressed, for example, in section 6.8 of U.S. Provisional Patent Application 61/079, 461, cited above, and in sections 5.1-5.3 of U.S. Provisional Patent Application 61/086,803, cited above. In particular, the compiler may identify cases in which executing a certain SID would trigger execution of another SID within a requirement for immediate update of a simulation running on the CPU. This scheme saves the latency of interaction between the GPU and CPU. This technique is addressed, for example, in section 5.2.1 of U.S. Provisional Patent Application 61/086, 803, cited above.

Parallelized Execution of Multiple Clock-Set-Reset Logic

Some hardware designs are characterized by a large number of relatively small logic sections, each section triggered by a different respective signal. For example, the design may comprise a large number of clock signals, each triggering a respective small section of the overall design. As another example, in designs that use flip-flop circuits, the SET and RESET signals typically trigger different logic sections. In many practical cases, each individual logic section is limited in parallelization, and is far from exploiting the parallel processing capability of GPU 32 on its own.

In some embodiments, the compilation process performed by CPU 28 produces a highly parallel SID 90 that executes a large number of logic sections in parallel. As explained above, each section is triggered by a respective signal, e.g., clock, set or reset signal.

Generally, the parallelism in SID 90 may be implemented using any desired number of execution sequences 98 and/or any desired number of PEs 76 that execute in parallel in a given sequence. The embodiments described herein focus on an implementation in which the multiple logical sections are compiled into a single execution sequence.

On one hand, this sort of SID generation makes better use of the parallel processing capabilities of the GPU. On the other hand, in order to retain the true functionality of the design, the logic corresponding to each section should be executed only if its triggering signal is indeed asserted.

Thus, in some embodiments, CPU 28 compiles into the execution sequence one or more additional PEs, referred to as ancillary PEs, which selectively execute only the logic corresponding to the logic sections whose triggering signals are asserted. If a certain logic section should not be executed, because its triggering signal is not asserted, the ancillary logic retains the current state of that logic section.

Consider, for example, an execution sequence comprising PEs that simulate two logic clouds denoted LC1 and LC2. In this example, LC1 is sampled with a Flip Flop FF1 on the rising edge of a clock signal CLK1, and LC2 is sampled with a Flip Flop FF2 on the rising edge of another clock signal CLK2. The compiler defines this execution sequence to be executed on the rising edge of CLK1 and/or CLK2. If only CLK1 rises, the ancillary logic should maintain the correct value for FF2. One possible implementation is to sample the previous value of FF2 again. If only CLK2 rises, the current state of FF1 is retained in a similar manner.

(Note that, in some implementations, inhibiting execution of a certain logic section involves execution of additional logic, not necessarily less logic. For example, when inhibiting execution is implemented by sampling the previous value of a FF, this sampling may involve additional logic.)

In an alternative embodiment, each execution sequence corresponds to a respective logic section and begins with an ancillary PE that checks whether the triggering signal of this logic section (e.g., clock, set and/or reset signal) is asserted. If asserted, the ancillary PE enables execution of the sequence. Otherwise, the ancillary PE inhibits execution of the sequence.

Implementations that combine multiple logic sections in the same execution sequence are typically preferable in scenarios in which many logic sections are likely to run simultaneously. Implementations that map each logic section to a separate execution sequences will typically perform well in low-activity scenarios in which only few logic sections run concurrently.

The description above referred mainly to logic that involves sampling, such as in Flip Flop circuits. Such logic is typically divided into three stages calculation of the logic before sampling, sampling in response to a triggering signal, and generation of visible signals. In this sort of logic, there is a distinction between the input signals to the logic and the triggering signals (e.g., clock, set or reset). The disclosed techniques can also be used to simulate combinatorial logic and other types of logic when the visible signals at the output are produced immediately from the input. In this sort of logic, each input signal is also regarded as a triggering signal.

Figure 20:
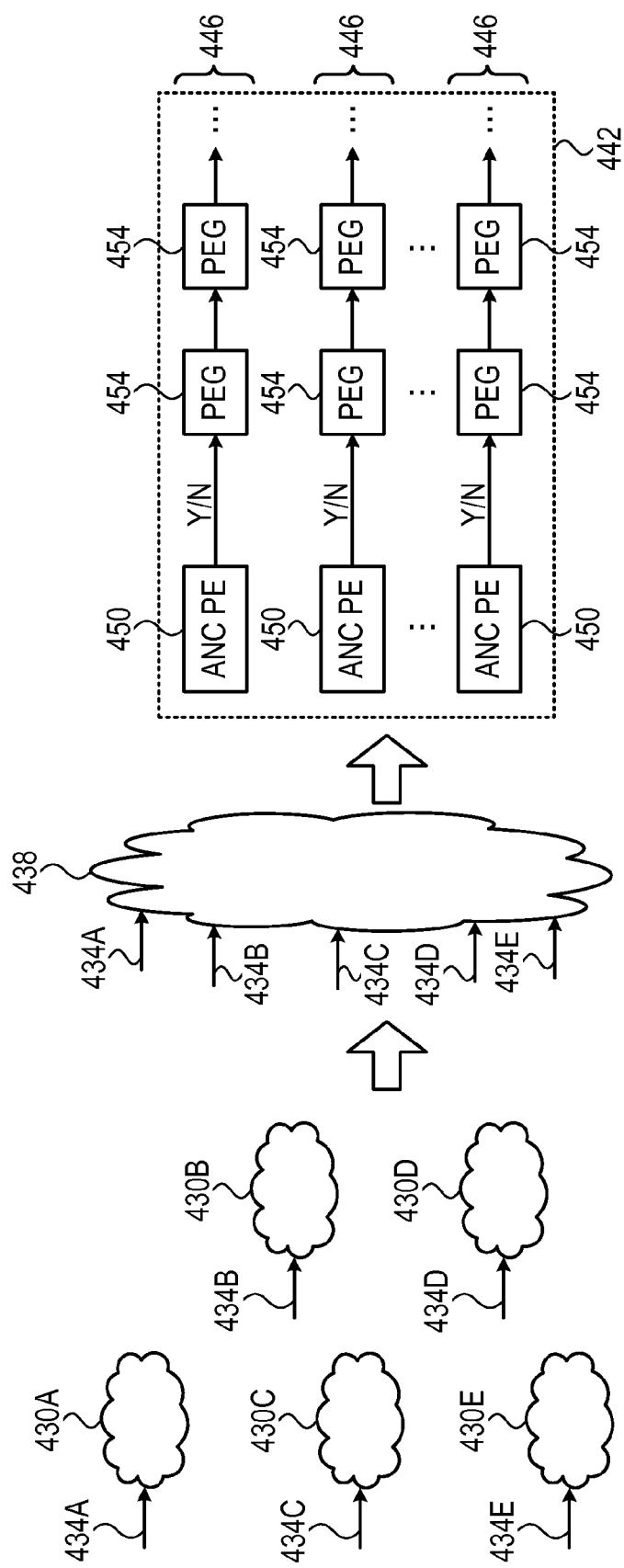
FIG. 20 is a diagram that schematically illustrates a scheme for parallelized execution of multiple clock-set-reset logic, in accordance with an embodiment of the present invention.

FIG. 20 is a diagram that schematically illustrates the above-described scheme for parallelized execution of multiple clock-set-reset logic, in accordance with an embodiment of the present invention. In the present example, the original design to be simulated comprises multiple logic sections 430A . . . 430E, also referred to as logic clouds. Logic sections 430A . . . 430E are triggered by respective triggering signals 434A . . . 434E. (For the sake of clarity, the present example relates more to combinatorial logic, where the input signals are also regarded as triggering signals. In Flip Flop or other sampling logic, the triggering signals are the signals that affect the Flip Flop, for example, clock, set or reset signals.)

As part of the compilation process, the compiler running on CPU 28 produces a combined logic cloud 438 that combines the functionalities of sections 430A . . . 430E. The combined cloud receives the multiple triggering signals 434A . . . 434E as inputs.

The compiler converts combined cloud 438 into a SID 442 that comprises one or more execution sequences 446. In one embodiment, the SID comprises a single execution sequence that accepts the various triggering signals as input. When the SID is invoked at run-time, the ancillary logic checks the triggering signals. If the triggering signal corresponding to a certain logic section is asserted, the ancillary logic enables execution of the PEs corresponding to that logic section. Otherwise, the ancillary logic inhibits execution of those PEs.

In an alternative embodiment, the SID comprises multiple execution sequences 446, one per each logic section. Each such execution sequence begins with an ancillary PE 450, followed by one or more PE Groups (PEGs) 454. When the SID is invoked at run-time, the ancillary PE of a given execution sequence checks whether any of the triggering signals that drive the PEs in that sequence is asserted. If asserted, the ancillary PE enables execution of the sequence. Otherwise, the ancillary PE inhibits execution of the sequence. Typically, each ancillary PE operates independently of the other ancillary PEs. In other words, the enable/inhibit decision is taken independently for each execution sequence.

When using the configurations above, SID 442 is highly parallelized and thus exploits the parallel processing capabilities of the GPU, even though the individual logic sections (clouds 430A . . . 430E) may have little or no parallelism.

Partitioning of PE Execution Between CPU and GPU

Typically, CPU 28 and GPU 32 differ from one another in their parallel execution capabilities and processing power in general. The GPU typically outperforms the CPU in executing highly-parallel tasks. When a task has little or no parallelism, however, it may be impossible to exploit the theoretical processing power of the GPU, in which case the CPU may outperform the GPU.

In some embodiments, at compilation time, the compiler in CPU 28 partitions the design (or other dependency problem) into high-parallelism phases in which the GPU is expected to outperform the CPU, and low-parallelism phases in which the CPU is expected to outperform the GPU. The compiler then generates suitable SIDs so as to execute the high-parallelism phases by the GPU and the low-parallelism phases by the CPU.

Figure 21:
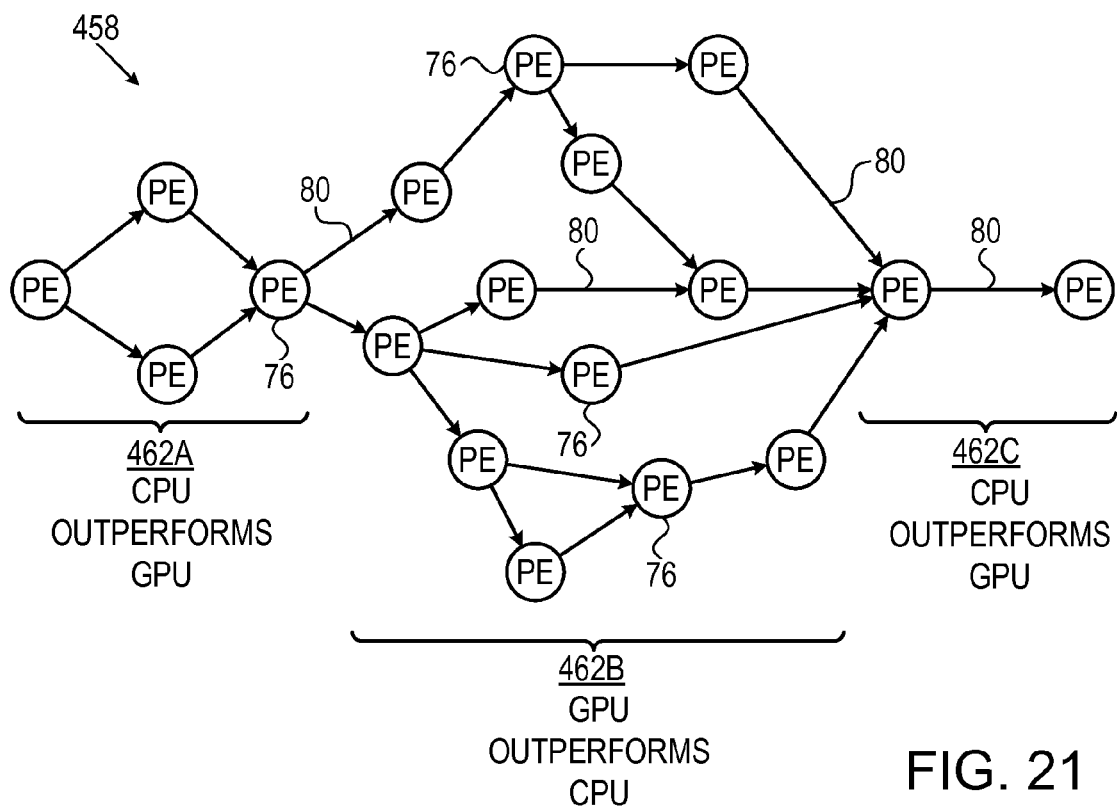
FIG. 21 is a diagram that schematically illustrates an execution graph of a dependency problem, in accordance with an embodiment of the present invention.

FIG. 21 is a diagram that schematically illustrates an execution graph 458 of a dependency problem, in accordance with an embodiment of the present invention. Graph 458 comprises multiple PEs 76 and execution dependencies 80 between the PEs. As can be seen in the figure, graph 458 can be divided into three sequential phases 462A . . . 462C.

Phases 462A and 462C are low-parallelism phases, in which only one or few PEs 76 are executed in parallel. Phase 462B is a high-parallelism phase, in which a relatively large number of PEs should be executed in parallel. In the present example (and in many practical scenarios) the low-parallelism phases occur at the beginning and/or end of the execution graph. Generally, however, the disclosed techniques can be used with any suitable number of low-parallelism and high-parallelism phases, which may occur at any suitable location in the execution graph.

Based on the levels of PE parallelism in the various phases, in phases 462A and 462C the CPU is expected to outperform the GPU, and in phase 462B the GPU is expected to outperform the CPU. In some embodiments, the compiler divides the execution graph into such low-parallelism and high-parallelism phases, assigns the low-parallelism phases for execution by CPU 28, and assigns the high-parallelism phases for execution by GPU 32.

Figure 22:
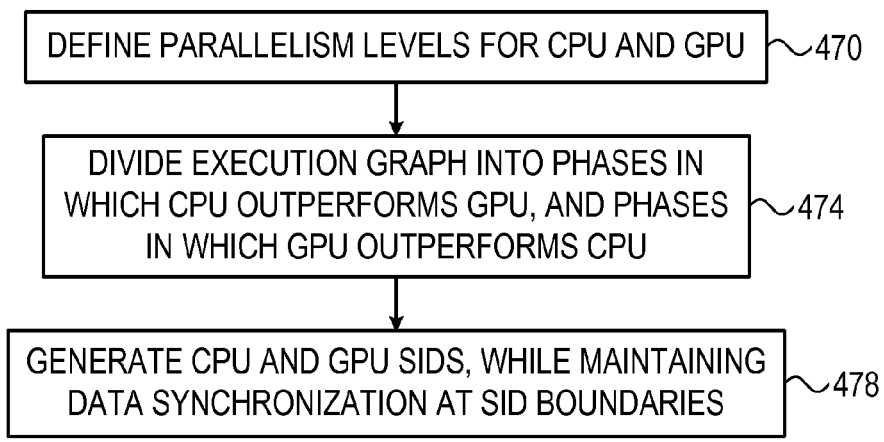
FIG. 22 is a flow chart that schematically illustrates a method for partitioning an execution graph between a Central Processing Unit (CPU) and a GPU, in accordance with an embodiment of the present invention.

FIG. 22 is a flow chart that schematically illustrates a method for partitioning an execution graph between CPU 28 and GPU 32, in accordance with an embodiment of the present invention. The method is typically carried out at compilation time by CPU 28.

The method begins with the compiler defining the parallelism levels that are suitable for the CPU and the GPU. In an embodiment, the definition specifies the maximal number of parallel PEs for which the CPU is still expected to outperform the GPU, and the minimal number of parallel PEs for which the GPU is expected to outperform the CPU. Alternatively, any other suitable definition or criterion can be used.

The compiler then uses the definition above to divide the execution graph into low-parallelism phases (in which the CPU is expected to outperform) and high-parallelism phases (in which the GPU is expected to outperform), at a graph partitioning step 474. The compiler may use any suitable criterion for selecting the boundaries between low-parallelism and high-parallelism phases.

The compiler translates each phase of the execution graph into a respective SID, at a SID generation step 478. Any suitable SID generation method can be used, such as the methods described above. A SID that simulates a low-parallelism phase is assigned for execution by the CPU (and referred to as a CPU SID). A SID that simulates a high-parallelism phase is assigned for execution by the GPU (and referred to as a GPU SID).

In the example of FIG. 21 above, phase 462A is translated into a CPU SID, phase 462B is translated into a GPU SID that is invoked after the CPU SID of 462A completed execution, and phase 462C is translated into a CPU SID that is invoked after the GPU SID of 462B completed execution. Generally, the compiler may generate any suitable number of interleaved CPU and GPU SIDs.

Typically, the compiler maintains data synchronization at the boundaries of successive SIDs. Data synchronization means that the signals produced by one SID are made available to the next SID in the sequence as it is invoked.

Synchronization Between Execution Sequences by Partitioning Execution Into Multiple GPU Invocations In some of the embodiments described above, such as in FIGS. 4 and 6, the compiler achieved synchronization between different execution sequences by inserting dedicated SYNC PEs into the sequences. A SYNC PE would typically halt its execution sequence until another execution sequence reaches some predefined execution stage.

In some GPUs or other multi-processor devices, however, SYNC PEs incur considerable overhead and are costly in terms of processing power. In alternative embodiments, the compiler forces the desired synchronization between execution sequences by partitioning the execution sequences into multiple GPU invocations. In the description that follows, the invocations are also referred to as phases, and the two terms are sometimes used interchangeably. Another benefit of this solution is that, when using SYNC PEs, the number of execution sequences should not exceed the number of thread blocks that GPU 32 can run concurrently. Synchronization by partitioning into multiple GPU invocations eliminates this constraint.

Figure 23:
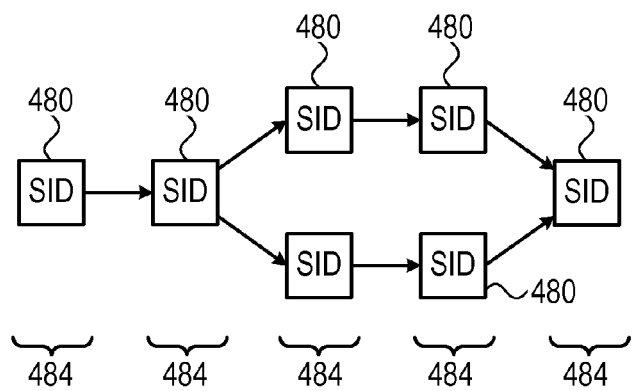
FIG. 23 is a diagram that schematically illustrates execution sequences partitioned into multiple GPU invocations, in accordance with an embodiment of the present invention.

FIG. 23 is a diagram that schematically illustrates execution sequences partitioned into multiple GPU invocations, in accordance with an embodiment of the present invention. In the present example, the compiler has broken the execution sequences into five successive invocations 484 of GPU 32. At run-time, in each invocation, GPU 32 executes one or more SIDs 480. In some embodiments, although not necessarily, each SID 480 comprises a single sequence of PEGs. Alternatively, however, a SID may comprise multiple PEG sequences.

(The term "GPU invocation" does not mean that GPU 32 is invoked by CPU 28 separately for each individual invocation. Typically, CPU 28 invokes GPU 32 with the entire set of invocations 484 seen in FIG. 23, and the GPU is responsible for scheduling the invocations and maintaining data synchronization between them.)

Under the GPU control, each GPU invocation 484 is executed in full before the next invocation begins. Therefore, all SIDs in a given invocation are guaranteed to complete their execution and produce outputs, before the GPU starts to execute any SID in the next invocation. Therefore, by using the invocation mechanisms of GPU 32, it is possible for the compiler to force synchronization between different execution sequences.

For example, assume that PE2 depends on the output of PE1, but the two PEs belong to different execution sequences. In order to preserve this dependency, the compiler may force synchronization by placing PE1 in one GPU invocation, and placing PE2 in a subsequent GPU invocation. In some GPUs or other multi-processor devices, the overhead incurred by multiple invocations is smaller than the overhead incurred by SYNC PEs. In such cases, the technique of FIG. 23 may be preferable.

Criteria for Partitioning Execution Sequences into Phases

Another motivation for dividing the execution sequences into phases (invocations) is to avoid unnecessary execution of execution sequences. As will be explained in detail below, the compiler is capable of inserting into the execution sequences logic that inhibits unnecessary execution.

This sort of logic may detect, for example, that the input to a certain execution sequence did not change since the previous execution of the sequence, that an element (e.g., flip-flop) downstream in the sequence is not triggered, or that the output of the sequence is not being used. In all such cases there is no point in executing the execution sequence. The logic inserted by the compiler detects such conditions at run-time and inhibits the execution of sequences accordingly. These mechanisms are highly efficient in reducing the simulation run time.

The division of the execution sequences into phases has considerable impact on the ability to avoid such unnecessary execution. For example, short phases (i.e., short execution sequences per SID) have a better chance of meeting the above conditions, and therefore increase the ability to avoid unnecessary execution. On the other hand, short phases incur more processing overhead because they increase the number of GPU invocations. in some embodiments, the compiler divides the execution sequences into phases while applying a suitable trade-off between avoiding unnecessary execution and reducing invocation overhead.

Figure 24:
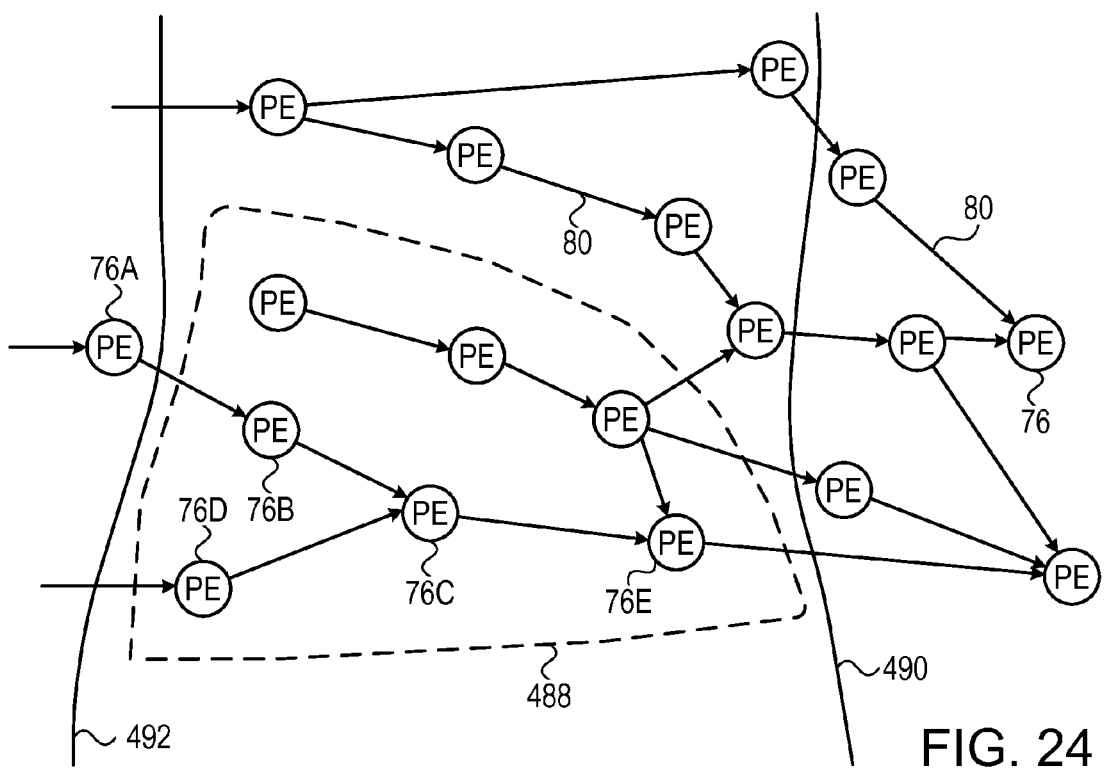
FIG. 24 is a diagram that schematically illustrates a process for partitioning execution sequences into phases, in accordance with an embodiment of the present invention.

FIG. 24 is a diagram that schematically illustrates an example process for partitioning execution sequences into phases, in accordance with an embodiment of the present invention. In this method, the compiler identifies "logical cones" in the dependency graph, and uses them to divide the graph into phases. A "logical cone" is defined as a PE (referred to as an "apex PE") that is last in a certain phase (invocation), plus the group of PEs that drive this PE up to a certain depth. Each PE has a "base," which is defined as the set of input signals received by PEs in the cone from outside the cone (e.g., from PEs outside the cone or from the CPU).

In order to clarify this concept, FIG. 24 shows an example dependency graph in which two phase boundaries 490 and 492, and an example logical cone 488 is marked. Logical cone 488 has a depth of 3 (defined as the longest chain of PEs in the cone) and a base size of 2 (defined as the number of input signals received from outside the logical cone). Alternatively, any other suitable values can be used.

Consider the above-described mechanism in which execution of a sequence is inhibited if the inputs to the sequence did not change since the last execution. Typically, a logical cone having a large base size is less likely to be inhibited from execution, in comparison with a logical cone having a small base size. A large-base cone typically has a large number of inputs, which typically means a small probability that none of the inputs has changed. A small-base cone has a smaller number of inputs, and therefore a higher probability that none of the inputs has changed.

In some embodiments, the compiler chooses the logical cones in accordance with some selection criterion, and sets the boundaries between phases at the base of the cones. The cone selection criterion typically aims to set the desired trade-off between reducing unnecessary execution and reducing invocation overhead. In some embodiments, the compiler chooses the logical cones so as not to exceed a predefined maximum base size, and so as not to exceed a predefined maximum depth. Alternatively, however, any other suitable selection criterion may be used.

In an example process, the compiler starts from phase boundary 492. The compiler initially chooses PE 76B in FIG. 24, which is located first in the subsequent phase (i.e., immediately following boundary 492). PE 76B receives a single input from PE 76A. Thus, PE 76B is regarded as a logical cone with depth=1 and base=1.

In this example this cone size does not yet exceed the maximum cone size, and therefore the compiler adds the next PE (PE 76C) to the cone. Adding PE 76C to the logical cone requires that PE 76D be added, as well. Thus, at this stage the logical cone comprises PEs 76B, 76C and 76D. This cone has depth=2 and base=2.

In the present example, this cone size still does not exceed the maximum cone size, and therefore the compiler adds the next PE (PE 76E) to the cone. Adding PE 76E means that all the PEs that drive PE 76E in the current phase be added too. Thus, at this stage the logical cone comprises all the cones encircled by curve 488.

In the next iteration the compiler adds the next PE (the PE driven by PE 76E) and the PEs that drive this PE to the cone. The last cone exceeds the permitted cone size defined in the selection criterion. Therefore, the iterative process stops with cone 488 selected and PE 76E serving as the apex of the cone. The compiler sets the boundary for the next phase (line 490) immediately following PE 76E. The process above continues until the entire dependency graph is divided into phases.

Figure 25:
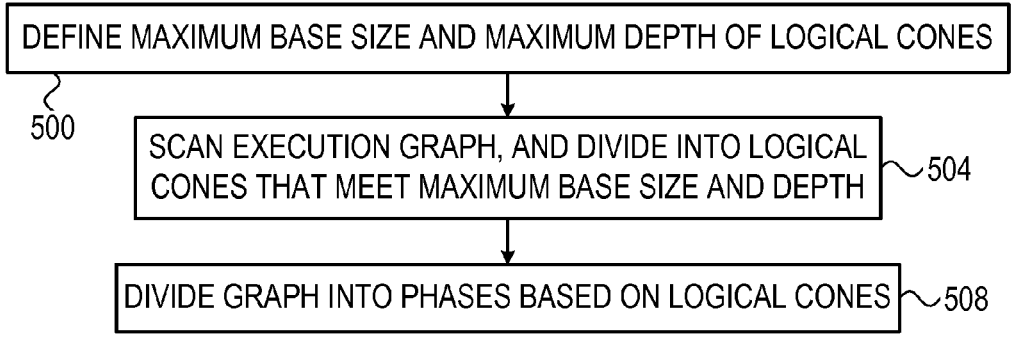
FIG. 25 is a flow chart that schematically illustrates a method for partitioning execution sequences into phases, in accordance with an embodiment of the present invention.

FIG. 25 is a flow chart that schematically illustrates a method for partitioning execution sequences into phases, in accordance with an embodiment of the present invention. The method begins with the compiler in CPU 28 defining a maximum base size and a maximum depth for the logical cones, at a criterion definition step 500. The compiler scans the dependency graph and divides the graph into logical cones, at a cone definition step 504. The compiler defines the logical cones in a manner that meets the selection criterion of step 500 (in the present example maximum base size and maximum depth). The compiler then divides the graph into phases based on the logical cones, at a phase partitioning step 508.

Avoiding Unnecessary Execution Using Sensitivity Information

In some embodiments, each execution sequence holds an indication that indicates whether any of the inputs to the execution sequence has changed since the previous execution of the sequence. This indication, which is referred to herein as sensitivity information, may change at run-time. When invoked, the execution sequence checks the current sensitivity information. If the sensitivity information shows that one or more of the inputs to the sequence have changes since the previous execution, the execution sequence is executed. Otherwise, the execution sequence is inhibited.

Updating of the sensitivity information at run-time can be carried out in various ways. In some embodiments, when an execution sequence is invoked, the GPU checks the current inputs to the sequence, compares them to the previous input values and updates the sensitivity information of the sequence as needed. In alternative embodiments, whenever a certain signal changes, the GPU updates the sensitivity information of all the sequences that accept this signal as input.

Figure 26:
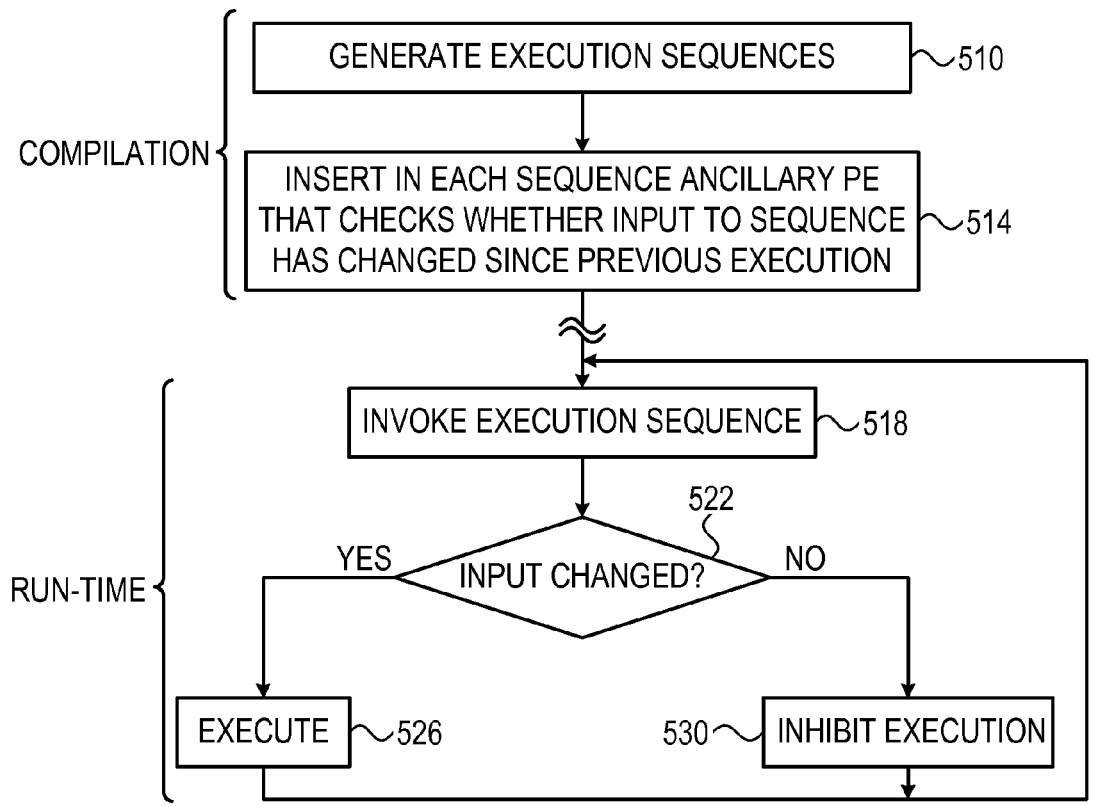
FIG. 26 is a flow chart that schematically illustrates a method for avoiding unnecessary execution using sensitivity information, in accordance with an embodiment of the present invention.

FIG. 26 is a flow chart that schematically illustrates a method for avoiding unnecessary execution using sensitivity information, in accordance with an embodiment of the present invention. The method begins with the compiler generating execution sequences, at a sequence generation step 510. At an insertion step 514, the compiler inserts into each execution sequence an ancillary PE that checks whether inputs to the sequence have changed since the previous execution.

At run-time, the GPU prepares to execute a certain execution sequence that was invoked, at an invocation step 518. The ancillary PE of the invoked sequence causes the GPU to check the sensitivity information, at a sensitivity checking step 522. If the sensitivity information shows that one or more inputs to the sequence have changed since the previous invocation, the GPU executes the sequence, at an execution step 526. Otherwise, the GPU inhibits execution of the sequence, at an inhibition step 530.

Avoiding Unnecessary Execution Using Trigger Information

Another scenario that involves unnecessary execution of an execution sequence occurs when a simulated component (e.g., flip-flop) downstream along the sequence is not triggered, and therefore will not sample the logic that was calculated in the sequence. In other words, in the absence of a trigger, the output of the sequence will not change regardless of the input and of the processing performed by the sequence. Therefore, there is no point in executing the sequence unless the element in question is triggered.

In some embodiments, when an execution sequence is invoked, the sequence (e.g., the first PE in the sequence) checks for the presence of a trigger to the downstream element. If not found, the sequence is inhibited. The presence or absence of a trigger signal is determined at run-time, and therefore the selection of whether or not to execute the sequence is also determined at run-time.

Figure 27:
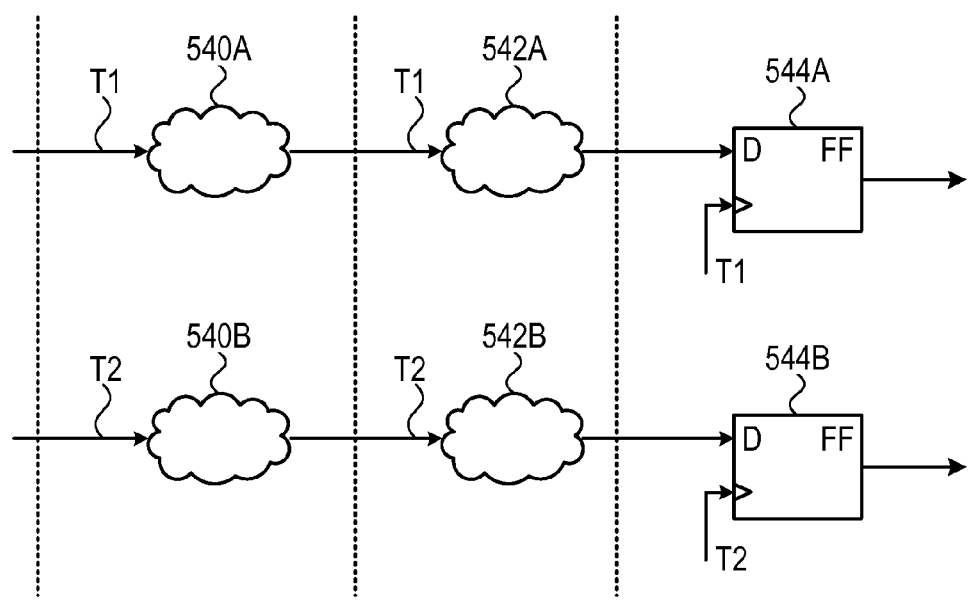
FIG. 27 is a diagram that schematically illustrates execution sequences with triggered elements, in accordance with an embodiment of the present invention.

FIG. 27 is a diagram that schematically illustrates execution sequences with triggered elements, in accordance with an embodiment of the present invention. The present example shows two execution sequences: The first sequence comprises logic 540A, followed by logic 542A, whose output is input to a D Flip-Flop (FF) 544A. The second sequence comprises logic 540B, followed by logic 542B, whose output is input to a D Flip-Flop (FF) 544B. Each logic cloud (540A, 542A, 540B, 542B) may comprise one or more PEs. FFs 544A and 544B are triggered by trigger signals T1 and T2, respectively.

In some embodiments, when compiling the execution sequences of FIG. 27, the compiler inserts an ancillary PE into each sequence (typically the first PE to be executed). The ancillary PE of the first sequence is configured to check whether trigger T1 is asserted or not. If the trigger is not asserted, the ancillary PE inhibits execution of the sequence (since without T1, executing the first sequence will not affect the sequence output). The ancillary PE of the second sequence operates similarly with regard to trigger T2.

In many practical cases, the execution sequence (e.g., logic 540A and 542A) is large and complex, and avoiding its execution increases the simulation efficiency significantly. As opposed to event-driven simulation techniques, the technique of FIG. 27 decides whether or not to execute a sequence based on future events that occur downstream in the sequence.

Avoiding Unnecessary Execution Using Sequence Output Look-Ahead

Figure 28:
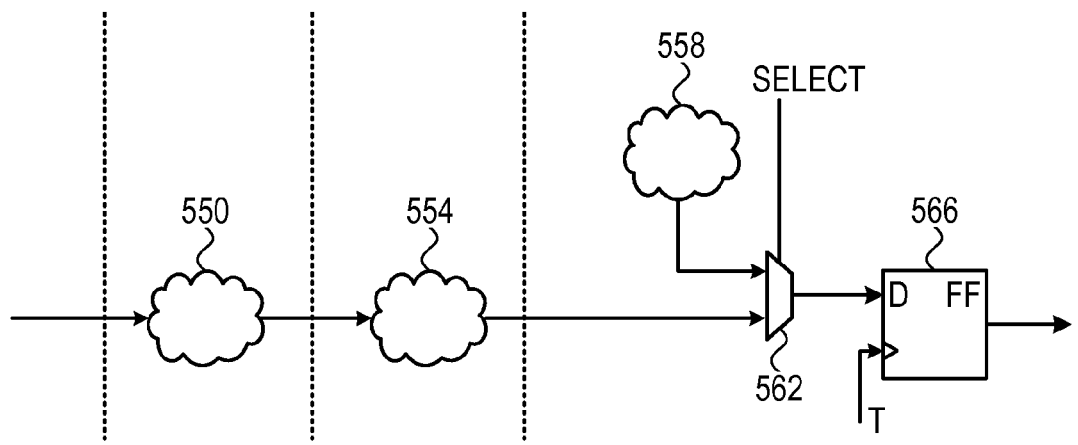
FIG. 28 is a diagram that schematically illustrates an execution sequence with a multiplexed output, in accordance with an embodiment of the present invention.

Yet another scenario that involves unnecessary execution of an execution sequence occurs when, for any reason, the sequence execution does not affect its output. FIG. 28 below demonstrates one such scenario.

FIG. 28 is a diagram that schematically illustrates an execution sequence with a multiplexed output, in accordance with an embodiment of the present invention. The execution sequence comprises logic 550, followed by logic 554, whose output is provided as input to a multiplexer (MUX) 562. Another input to the MUX is provided by logic 558. A SELECT signal selects which of the MUX inputs will be transferred to the MUX output. The selected MUX output is provided to a D-FF 566, which is triggered by a trigger signal T.

In the present example, there is no point in executing logic 550 and 554, unless MUX 562 transfers the output of logic 554 to FF 566. In other words, even if the signals at the input of logic 550 have changed, and even if trigger T of FF 566 is asserted, executing logic 550 and 554 will not affect the sequence output unless MUX 562 selects the output of logic 554.

In some embodiments, logic 550 and 554 are large and complex, and logic 558 is modest. This situation is common, for example, in Automatic Test Pattern Generation (ATPG) circuitry in Integrated Circuit (IC) design. In such cases, the potential performance gain of avoiding unnecessary execution of logic 550 and 554 is very high.

In some embodiments, when compiling the execution sequence of FIG. 28, the compiler inserts an ancillary PE into the sequence (typically the first PE to be executed). At run-time, the ancillary PE is configured to check whether MUX 562 is set to select the output of logic 554 or the output of logic 558. If the latter, the ancillary PE inhibits execution of logic 550 and 554. If the former, the ancillary PE enables execution of the entire sequence.

The MUX implementation shown in FIG. 28 is chosen purely by way of example. In alternative embodiments, the ancillary PE (or any other logic) may check generally whether execution of the sequence will affect the sequence output. If not, the sequence execution is inhibited. Like the scheme of FIG. 27 above, the look-ahead scheme of FIG. 28 is in sharp contrast to event-driven simulation techniques, and is highly efficient in reducing simulation run time.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computing method, comprising:
accepting a definition of a computing task, which comprises multiple Processing Elements (PEs) having execution dependencies;
compiling the computing task for concurrent execution on a multiprocessor device, by arranging the PEs in a series of two or more invocations of the multiprocessor device, including assigning the PEs to the invocations depending on the execution dependencies; and
invoking the multiprocessor device to run software code that executes the series of the invocations, so as to produce a result of the computing task,
wherein the multiprocessor device completes a preceding invocation before beginning a subsequent invocation in the series, such that outputs of the PEs in the preceding invocation are available as input to the PEs in the subsequent invocation.

2. The method according to claim 1, wherein assigning the PEs to the invocations comprises assigning a first PE to a first invocation and assigning a second PE, which according to the execution dependencies is to be executed after the first PE, in a second invocation that is later than the first invocation in the series.

3. The method according to claim 1, wherein assigning the PEs to the invocations comprises interleaving in the series one or more invocations of a Central Processing Unit (CPU) in addition to the invocations of the multiprocessor device, and assigning one or more of the PEs to the invocations of the CPU.

4. The method according to claim 3, wherein assigning the PEs to the invocations comprises identifying a first portion of the computing task whose execution by the multiprocessor device is expected to outperform execution by the CPU, identifying a second portion of the computing task whose execution by the CPU is expected to outperform execution by the multiprocessor device, assigning the first portion to the invocations of the multiprocessor device, and assigning the second portion to the invocations of the CPU.

5. The method according to claim 3, wherein assigning the PEs to the invocations comprises assigning the PEs in a first portion of the computing task, which has a first level of parallelism, to the invocations of the multiprocessor device, and assigning the PEs in a second portion of the computing task, which has a second level of parallelism that is lower than the first level, to the invocations of the CPU.

6. The method according to claim 1, wherein compiling the computing task comprises defining a sequence of the PEs that is to be executed conditionally depending on a condition that is evaluated at run-time, and wherein assigning the PEs to the invocations comprises evaluating a criterion that aims to maximize a likelihood that the sequence will not be executed.

7. The method according to claim 6, wherein evaluating the criterion comprises dividing the computing tasks into logical cones, each logical cone comprising an apex PE that is last in a respective invocation and a group of the PEs on which the apex PE depends, wherein a maximum depth and a maximum base size of the logical cones are specified based on the likelihood, and setting invocation boundaries at respective bases of the logical cones.

8. A computing apparatus, comprising:
an interface, which is configured to accept a definition of a computing task, which comprises multiple Processing Elements (PEs) having execution dependencies; and
a processor, which is configured to compile the computing task for concurrent execution on a multiprocessor device, by arranging the PEs in a series of two or more invocations of the multiprocessor device, including assigning the PEs to the invocations depending on the execution dependencies, and to invoke the multiprocessor device to run software code that executes the series of the invocations, so as to produce a result of the computing task,
wherein the multiprocessor device completes a preceding invocation before beginning a subsequent invocation in the series, such that outputs of the PEs in the preceding invocation are available as input to the PEs in the subsequent invocation.

9. The apparatus according to claim 8, wherein the processor is configured to assign a first PE to a first invocation and to assign a second PE, which according to the execution dependencies is to be executed after the first PE, in a second invocation that is later than the first invocation in the series.

10. The apparatus according to claim 8, wherein the processor is configured to interleave in the series one or more invocations of a Central Processing Unit (CPU) in addition to the invocations of the multiprocessor device, and to assign one or more of the PEs to the invocations of the CPU.

11. The apparatus according to claim 10, wherein the processor is configured to identify a first portion of the computing task whose execution by the multiprocessor device is expected to outperform execution by the CPU, to identify a second portion of the computing task whose execution by the CPU is expected to outperform execution by the multiprocessor device, to assign the first portion to the invocations of the multiprocessor device, and to assign the second portion to the invocations of the CPU.

12. The apparatus according to claim 10, wherein the processor is configured to assign the PEs in a first portion of the computing task, which has a first level of parallelism, to the invocations of the multiprocessor device, and to assign the PEs in a second portion of the computing task, which has a second level of parallelism that is lower than the first level, to the invocations of the CPU.

13. The apparatus according to claim 8, wherein the processor is configured to define a sequence of the PEs that is to be executed conditionally depending on a condition that is evaluated at run-time, and to assign the PEs to the invocations by evaluating a criterion that aims to maximize a likelihood that the sequence will not be executed.

14. The apparatus according to claim 13, wherein the processor is configured to divide the computing tasks into logical cones, each logical cone comprising an apex PE that is last in a respective invocation and a group of the PEs on which the apex PE depends, wherein a maximum depth and a maximum base size of the logical cones are specified based on the likelihood, and to set invocation boundaries at respective bases of the logical cones.

15. A computing method, comprising:
accepting a definition of a computing task, which comprises multiple Processing Elements (PEs) having execution dependencies;
compiling the computing task for concurrent execution on a multiprocessor device, by arranging the PEs in multiple execution sequences, including compiling, for a given execution sequence, ancillary logic that evaluates a condition at run-time and, depending on the condition, enables or inhibits execution of the given execution sequence; and
invoking the multiprocessor device to run software code that executes the execution sequences, so as to produce a result of the computing task.

16. The method according to claim 15, wherein compiling the ancillary logic comprises defining at a beginning of the given execution sequence an ancillary PE that evaluates the condition and enables or inhibits the execution.

17. The method according to claim 15, wherein the condition inhibits execution of the given execution sequence upon identifying that input to the given execution sequence did not change since a previous execution of the given execution sequence.

18. The method according to claim 15, wherein the condition inhibits execution of the given execution sequence upon identifying that a trigger signal of a component simulated in the given execution sequence is not asserted.

19. The method according to claim 15, wherein the condition inhibits execution of the given execution sequence upon identifying that the execution of the given execution sequence will not affect an output of the given execution sequence.

20. A computing apparatus, comprising:
an interface, which is configured to accept a definition of a computing task, which comprises multiple Processing Elements (PEs) having execution dependencies; and
a processor, which is configured to compile the computing task for concurrent execution on a multiprocessor device, by arranging the PEs in multiple execution sequences, including compiling, for a given execution sequence, ancillary logic that evaluates a condition at run-time and, depending on the condition, enables or inhibits execution of the given execution sequence, and to invoke the multiprocessor device to run software code that executes the execution sequences, so as to produce a result of the computing task.

21. The apparatus according to claim 20, wherein the processor is configured to define at a beginning of the given execution sequence an ancillary PE that evaluates the condition and enables or inhibits the execution.

22. The apparatus according to claim 20, wherein the condition inhibits execution of the given execution sequence upon identifying that input to the given execution sequence did not change since a previous execution of the given execution sequence.

23. The apparatus according to claim 20, wherein the condition inhibits execution of the given execution sequence upon identifying that a trigger signal of a component simulated in the given execution sequence is not asserted.

24. The apparatus according to claim 20, wherein the condition inhibits execution of the given execution sequence upon identifying that the execution of the given execution sequence will not affect an output of the given execution sequence.

25. A computing method, comprising:
accepting a definition of a computing task, which comprises a plurality of logic sections triggered by triggering signals;
compiling the definition of the computing task for concurrent execution on a multiprocessor device, so as to generate combined logic, which executes the plurality of the logic sections and which comprises ancillary logic that selectively enables execution of a part of the computing task corresponding to the logic sections whose triggering signals are asserted; and
invoking the multiprocessor device to run software code that executes the combined logic, so as to produce a result of the computing task.

26. The method according to claim 25, wherein compiling the definition comprises generating a single execution sequence that executes the multiple logic sections, including configuring the ancillary logic to enable the execution of only Processing Elements (PEs) in the execution sequence corresponding to the logic sections whose triggering signals are asserted.

27. The method according to claim 25, wherein the triggering signals comprise at least one signal type selected from a group of types consisting of clock signals, set signals and reset signals.

28. The method according to claim 25, wherein compiling the definition comprises generating multiple execution sequences that execute the respective logic sections, and inserting into each execution sequence an ancillary Processing Element (PE) that selectively enables execution of the execution sequence depending on the respective triggering signals.

29. A computing apparatus, comprising:
an interface, which is configured to accept a definition of a computing task, which comprises a plurality of logic sections triggered by triggering signals; and
a Central Processing Unit (CPU), which is configured to compile the definition of the computing task for concurrent execution on a multiprocessor device, so as to generate combined logic, which executes the plurality of the logic sections and which comprises ancillary logic that selectively enables execution of a part of the computing task corresponding to the logic sections whose triggering signals are asserted, and to invoke the multiprocessor device to run software code that executes the combined logic, so as to produce a result of the computing task.

30. The apparatus according to claim 29, wherein the CPU is configured to generate a single execution sequence that executes the multiple logic sections, including configuring the ancillary logic to enable the execution of only Processing Elements (PEs) in the execution sequence corresponding to the logic sections whose triggering signals are asserted.

31. The apparatus according to claim 29, wherein the triggering signals comprise at least one signal type selected from a group of types consisting of clock signals, set signals and reset signals.

32. The apparatus according to claim 29, wherein the CPU is configured to generate multiple execution sequences that execute the respective logic sections, and to insert into each execution sequence an ancillary Processing Element (PE) that selectively enables execution of the execution sequence depending on the respective triggering signals.

* * * * *